US012282328B2

(12) United States Patent
Urtasun et al.

(10) Patent No.: US 12,282,328 B2
(45) Date of Patent: Apr. 22, 2025

(54) SYSTEMS AND METHODS FOR USING ATTENTION MASKS TO IMPROVE MOTION PLANNING

(71) Applicant: Aurora Operations, Inc., Pittsburgh, PA (US)

(72) Inventors: Raquel Urtasun, Toronto (CA); Bob Qingyuan Wei, Waterloo (CA); Mengye Ren, Toronto (CA); Wenyuan Zeng, Toronto (CA); Ming Liang, Toronto (CA); Bin Yang, Toronto (CA)

(73) Assignee: AURORA OPERATIONS, INC., Pittsburgh, PA (US)

( * ) Notice: Subject to any disclaimer, the term of this patent is extended or adjusted under 35 U.S.C. 154(b) by 537 days.

(21) Appl. No.: 17/150,987

(22) Filed: Jan. 15, 2021

(65) Prior Publication Data

US 2021/0278852 A1 Sep. 9, 2021

Related U.S. Application Data

(60) Provisional application No. 63/132,967, filed on Dec. 31, 2020, provisional application No. 62/985,848, filed on Mar. 5, 2020.

(51) Int. Cl.
*G05D 1/00* (2024.01)
*B60W 60/00* (2020.01)
(Continued)

(52) U.S. Cl.
CPC ......... *G05D 1/0217* (2013.01); *B60W 60/001* (2020.02); *G05D 1/0214* (2013.01);
(Continued)

(58) Field of Classification Search
CPC ........ B60W 60/001; B60W 60/00–007; G05D 1/0217; G05D 1/0214; G05D 2201/0213;
(Continued)

(56) References Cited

U.S. PATENT DOCUMENTS 11,093,767 B1 * 8/2021 Argenti ................. B60W 50/14
11,580,687 B2 * 2/2023 Rosenzweig ........... G06T 17/05
(Continued)

OTHER PUBLICATIONS

Ba et al, "Multiple Object Recognition with Visual Attention", arXiv:1412.7755v2, Apr. 23, 2015, 10 pages.
(Continued)

*Primary Examiner* — Mohamed Abdo Algehaim
(74) *Attorney, Agent, or Firm* — Dority & Manning, P.A.

(57) ABSTRACT

Systems and methods for generating attention masks are provided. In particular, a computing system can access sensor data and map data for an area around an autonomous vehicle. The computing system can generate a voxel grid representation of the sensor data and map data. The computing system can generate an attention mask based on the voxel grid representation. The computing system can generate, by using the voxel grid representation and the attention mask as input to a machine-learned model, an attention weighted feature map. The computing system can determine using the attention weighted feature map, a planning cost volume for an area around the autonomous vehicle. The computing system can select a trajectory for the autonomous vehicle based, at least in part, on the planning cost volume.

14 Claims, 9 Drawing Sheets

(51) Int. Cl.
    *G06F 18/213* (2023.01)
    *G06N 20/00* (2019.01)
    *G06T 17/05* (2011.01)
    *G06V 10/82* (2022.01)
    *G06V 20/56* (2022.01)

(52) U.S. Cl.
    CPC ........... *G06F 18/213* (2023.01); *G06N 20/00* (2019.01); *G06T 17/05* (2013.01); *G06V 10/82* (2022.01); *G06V 20/56* (2022.01)

(58) Field of Classification Search
    CPC ........... G05D 1/00–1/12; G06F 18/213; G06T 17/05; G06N 20/00; G06N 3/045; G06N 3/08; G06V 10/82; G06V 20/56
    USPC .......................................................... 701/25
    See application file for complete search history.

(56) References Cited

U.S. PATENT DOCUMENTS

| | | | |
|---|---|---|---|
| 2015/0175070 A1* | 6/2015 | Attard | B60W 50/14 340/439 |
| 2017/0185846 A1* | 6/2017 | Hwangbo | G06V 10/40 |
| 2017/0270361 A1* | 9/2017 | Puttagunta | B60W 30/00 |
| 2018/0012370 A1* | 1/2018 | Aghamohammadi | G06F 18/251 |
| 2018/0182109 A1* | 6/2018 | Sun | G06T 7/277 |
| 2018/0339710 A1* | 11/2018 | Hashimoto | G06N 3/044 |
| 2019/0049968 A1* | 2/2019 | Dean | A61G 5/04 |
| 2019/0051198 A1* | 2/2019 | Nimmagadda | G05D 1/0274 |
| 2019/0258737 A1* | 8/2019 | Wang | G01C 21/3848 |
| 2019/0317520 A1* | 10/2019 | Zhang | G05D 1/0214 |
| 2019/0332118 A1* | 10/2019 | Wang | G06T 7/187 |
| 2020/0003897 A1* | 1/2020 | Shroff | G01S 17/931 |
| 2020/0026292 A1* | 1/2020 | Douillard | G05D 1/0212 |
| 2020/0090322 A1* | 3/2020 | Seo | G06N 3/084 |
| 2020/0139973 A1* | 5/2020 | Palanisamy | G08G 1/167 |
| 2020/0143204 A1* | 5/2020 | Nakano | G06V 10/82 |
| 2020/0225669 A1* | 7/2020 | Silva | B60W 60/0011 |
| 2020/0310753 A1* | 10/2020 | Radu | G01J 5/02 |
| 2020/0355820 A1* | 11/2020 | Zeng | G01S 13/865 |
| 2021/0001891 A1* | 1/2021 | Majithia | B60W 60/0025 |
| 2021/0063578 A1* | 3/2021 | Wekel | G01S 7/481 |
| 2021/0142064 A1* | 5/2021 | Shimizu | G06T 7/73 |
| 2021/0170594 A1* | 6/2021 | Kuo | G06N 3/045 |
| 2021/0192199 A1* | 6/2021 | Bagwell | G06V 20/58 |
| 2021/0192689 A1* | 6/2021 | Bosse | G06F 18/2135 |
| 2021/0213973 A1* | 7/2021 | Carillo Peña | B60W 60/0011 |
| 2021/0270633 A1* | 9/2021 | Tomono | G01C 21/387 |
| 2021/0312725 A1* | 10/2021 | Milton | G07C 5/008 |
| 2021/0383213 A1* | 12/2021 | Kawasaki | G06N 3/04 |
| 2022/0035375 A1* | 2/2022 | Rezaee | G05B 13/027 |
| 2022/0147791 A1* | 5/2022 | Yao | G06N 3/0495 |
| 2022/0168899 A1* | 6/2022 | Boroushaki | B25J 9/1697 |
| 2022/0301311 A1* | 9/2022 | Abati | G06V 10/761 |
| 2023/0054134 A1* | 2/2023 | Herman | G01S 7/4026 |
| 2023/0146134 A1* | 5/2023 | Selviah | G06V 20/653 345/419 |
| 2023/0419113 A1* | 12/2023 | Genc | G06F 17/16 |

OTHER PUBLICATIONS

Bahdanau et al, "Neural Machine Translation by Jointly Learning to Align and Translate", arXiv:1409.0473v7, May 19, 2016, 15 pages.
Bengio et al, "Estimating or Propagating Gradients through Stochastic Neurons for Conditional Computation", arXiv:1308.3432v1, Aug. 15, 2013, 12 pages.
Caesar et al, "NuScenes: A Multimodal Dataset for Autonomous Driving", arXiv:1903.11027v5, May 5, 2020, 16 pages.
Chen et al, "GradNorm: Gradient Normalization for Adaptive Loss Balancing in Deep Multitask Networks", arXiv:1711.02257v4, Jun. 12, 2018, 12 pages.
Devlin et al, "BERT: Pre-Training of Deep Bidirectional Transformers for Language Understanding", arXiv:1810.04805V2, May 24, 2019, 16 pages.
Fan et al, "Baidu Apollo EM Motion Planner", arXiv:1807.08048v1, Jul. 20, 2018, 15 pages.
Figurnov et al, "Spatially Adaptive Computation Time for Residual Networks", arXiv:1612.02297v2, Jul. 2, 2017, 13 pages.
Graham et al, "3D Semantic Segmentation with Submanifold Sparse Convolutional Networks", arXiv:1711.10275v1, Nov. 28, 2017, 11 pages.
Guo et al, "Dynamic Task Prioritization for Multitask Learning", European Conference on Computer Vision, Sep. 8-14, 2018, Munich, Germany, 18 pages.
Itti, et al, "A Model of Saliency-Based Visual Attention for Rapid Scene Analysis", Transactions on Pattern Analysis and Machine Intelligence, vol. 20, No. 11, Nov. 1998, pp. 1254-1259.
Itti, et al, "Neurobiology of Attention", Academic Press, Burlington, 2005.
Jang et al, Categorical Reparameterization with Gumbel-Softmax, arXiv:1611.01144v5, Aug. 5, 2017, 13 pages.
Judd et al, "Cnvlutin2: Ineffectual-Activation-and-Weight-Free Deep Neural Network Computing", arXiv:1705.00125v1, Apr. 29, 2017, 6 pages.
Judd et al, "Learning to Predict Where Humans Look", Conference on Computer Vision, Jun. 20-25, 2009, Miami, Florida, United States, pp. 2106-2113.
Kendall et al, "Multi-Task Learning Using Uncertainty to Weigh Losses for Scene Geometry and Semantics", arXiv:1705.07115v3, Apr. 24, 2018, 14 pages.
Kingma, "Adam: A Method for Stochastic Optimization", arXiv:1412.6980v9, Jan. 30, 2017, 15 pages.
Lacotte et al, "Risk-Sensitive Generative Adversarial Imitation Learning", International Conference on Artificial Intelligence and Statistics, Apr. 16-18, 2019. Naha, Okinawa, Japan, 10 pages.
Larochelle et al, "Learning to Combine Foveal Glimpses with a Third Order Boltzmann Machine", Conference on Neural Information Processing Systems, Dec. 6-11, 2010, 9 pages.
Li et al, "Not All Pixels Are Equal: Difficulty-Aware Semantic Segmentation Via Deep Layer Cascade", arXiv:1704.01344v1, Apr. 5, 2017, 11 pages.
Liang et al, "PnPNet: End-to-End Perception and Prediction with Tracking in the Loop", Conference on Computer Vision and Pattern Recognition, Jun. 14-19, 2020, Virtual, pp. 11553-11562.
Lin et al, "Adaptive Auxiliary Task Weighting for Reinforcement Learning", Conference on Neural Information Processing Systems, Dec. 8-14, 2019, Vancouver, Canada, 12 pages.
Liu et al, "End-to-End Multi-Task Learning with Attention", arXiv:1803.10704v2, Apr. 5, 2019, 10 pages.
Liu et al, "Learning Efficient Convolutional Networks Through Network Slimming", arXiv:1708.06519v1, Aug. 22, 2017, 10 pages.
Liu et al, "Sparse Convolutional Neural Networks", Conference on Computer Vision and Pattern Recognition, Jun. 7-12, 2015, Boston, Massachusetts, United States, pp. 806-814.
Lu et al, "Hierarchical Question-Image Co-Attention for Visual Question Answering", arXiv:1606.00061v5, Jan. 19, 2017, 11 pages.
Maddison et al, "The Concrete Distribution: A Continuous Relaxation of Discrete Random Variables", arXiv:1611.00712v3, Mar. 5, 2017, 20 pages.
Olshausen et al, "Sparse Coding with an Overcomplete Basis Set: A Strategy Employed by V1?", Vision Research, vol. 37, No. 23, 1997, pp. 3311-3325.
Orzechowski et al, "Tackling Occlusions & Limited Sensor Range with Set-Based Safety Verification", arXiv:1807.01262v3, May 6, 2019, 8 pages.
Pek et al, "Computationally Efficient Fail-Safe Trajectory Planning for Self-Driving Vehicles Using Convex Optimization", International Thermal Spray Conference, May 7-10, 2018, Orlando, Florida, United States, 8 pages.
Refaat et al, "Agent Prioritization for Autonomous Navigation", arXiv:1909.08792v1, Sep. 19, 2019, 8 pages.
Ren et al, "End-to-End Instance Segmentation with Recurrent Attention", arXiv:1605.09410v5, Jul. 13, 2017, 12 pages.

(56) References Cited

OTHER PUBLICATIONS

Ren et al, "Learning to Reweight Examples for Robust Deep Learning", arXiv:1803.09050v3, May 5, 2019, 13 pages.
Ren et al, "SBNet: Sparse Blocks Network for Fast Inference", arXiv:1801.02108V2, Jun. 7, 2018, 10 pages.
Ronneberger et al, "U-Net: Convolutional Networks for Biomedical Image Segmentation", arXiv:1505.04597v1, May 18, 2015, 8 pages.
Sadat et al, "Jointly Learnable Behavior and Trajectory Planning for Self-Driving Vehicles", arXiv:1910.04586v1, Oct. 10, 2019, 8 pages.
Shalev-Shwartz et al, "On a Formal Model of Safe and Scalable Self-Driving Cars", arXiv:1708.06374v6, Oct. 27, 2018, 37 pages.
Shi et al, "Speeding Up Convolutional Neural Networks by Exploiting the Sparsity of Rectifier Units", arXiv:1704.07724v2, May 15, 2017, 7 pages.
Shin et la, "Path Generation for Robot Vehicles Using Composite Clothoid Segments", Intelligent Components and Instruments for Control Applications, Malaga, Spain, 1992, 6 pages.
Singh et al, "Risk-Sensitive Inverse Reinforcement Learning Via Semi- and Non-Parametric Methods", arXiv:1711.10055v2, Mar. 22, 2018, 45 pages.
Tas et al, "Decision-Time Postponing Motion Planning for Combinatorial Uncertain Maneuvering", arXiv:2012.07170v1, Dec. 13, 2020, 7 pages.
Vaswani et al, "Attention is All You Need", arXiv:1706.03762v5, Dec. 6, 2017, 15 pages.
Wang et al, "Residual Attention Network for Image Classification", arXiv:1704.06904v1, Apr. 23, 2017, 9 pages.
Xu et al, "Show, Attend and Tell: Neural Image Caption Generation with Visual Attention", arXiv:1502.03044v3, Apr. 9, 2016, 22 pages.
Yang et al, "Stacked Attention Networks for Image Question Answering", arXiv:1511.02274v2, Jan. 26, 2016, 11 pages.
Zeng et al, "End-to-End Interpretable Neural Motion Planner", arXiv:2101.06679v1, Jan. 17, 2021, 10 pages.

\* cited by examiner

SYSTEMS AND METHODS FOR USING ATTENTION MASKS TO IMPROVE MOTION PLANNING

RELATED APPLICATION

This application claims priority to and the benefit of U.S. Provisional Patent Application No. 62/985,848, filed Mar. 5, 2020 and U.S. Provisional Patent Application No. 63/132,967, filed Dec. 31, 2020 which are hereby incorporated by reference in their entirety.

FIELD

The present disclosure relates generally to autonomous vehicles. More particularly, the present disclosure relates to path planning in autonomous vehicles.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such a surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include accessing, by a computing system including one or more processors, sensor data and map data for an area around an autonomous vehicle. The method can include generating, by the computing system, a voxel grid representation of the sensor data and map data. The method can include generating, by the computing system, an attention mask based on the voxel grid representation. The method can include generating, by the computing system by using the voxel grid representation and the attention mask as input to a machine-learned model, an attention weighted feature map. The method can include determining, by the computing system, using the attention weighted feature map, a planning cost volume for an area around the autonomous vehicle. The method can include selecting, by the computing system, a trajectory for the autonomous vehicle based, at least in part, on the planning cost volume.

Another example aspect of the present disclosure is directed to a computing system. The computing system can include one or more processors and one or more non-transitory computer-readable memories, wherein the one or more non-transitory computer-readable memories store instructions that, when executed by the processor, cause the computing system to perform operations. The operations can include accessing sensor data and map data for an area around the autonomous vehicle. The operations can include generating a voxel grid representation of the sensor data and map data. The operations can include generating an attention mask based on the voxel grid representation. The operations can include generating, by using the voxel grid representation and the attention mask as input to a machine-learned model, an attention weighted feature map. The operations can include determining, by using the attention weighted feature map, a planning cost volume for an area around the autonomous vehicle. The operations can include selecting a trajectory for the autonomous vehicle based on the planning cost volume.

Another example aspect of the present disclosure is directed to a computer-implemented method. The method can include providing, by a computing system with one or more processors, a set of training sensor data as input to one or more machine-learned models, the machine-learned models comprising a set of weights. The method can include receiving, by the computing system, as output from the one or more machine-learned models, perception data and a binary attention mask. The method can include generating, by the computing system, perception loss data by determining a difference between the perception data received from the one or more machine-learned models and predetermined ground truth data associated with the training sensor data. The method can include modifying, by the computing system, the perception loss data based on the binary attention mask. The method can include updating, by the computing system, the set of weights included in the one or more machine-learned models based on the modified perception loss data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
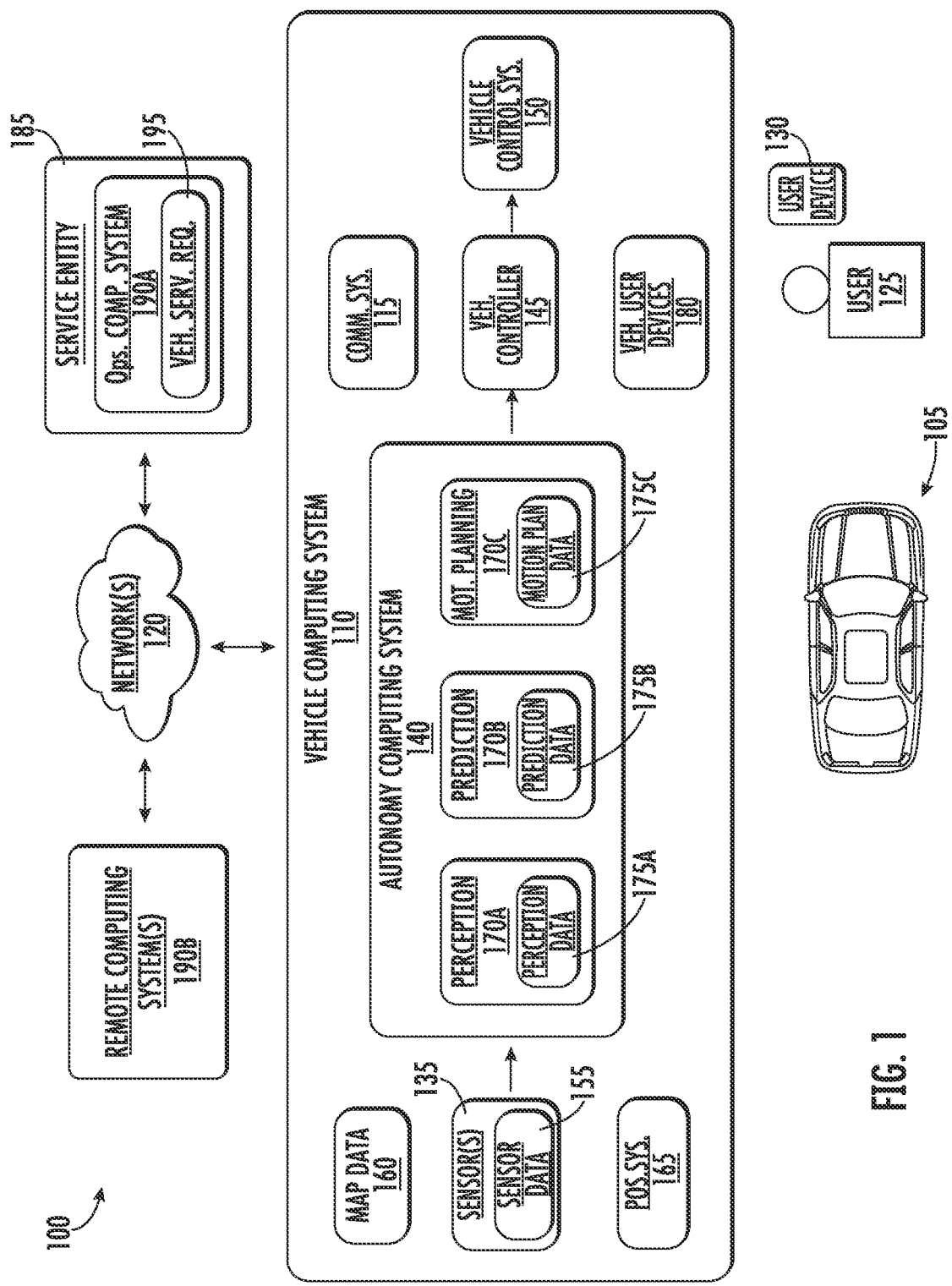
FIG. 1 depicts a block diagram of an example autonomous vehicle according to example embodiments of the present disclosure.

Generally, the present disclosure is directed towards improving perception, prediction, and motion planning in an autonomous system such as, for example, an autonomous vehicle that includes a vehicle computing system. The vehicle computing system can do so by utilizing a machine-learned model trained to generate a binary attention mask that is used to ensure that the resources (e.g., processing cycles, memory, and so on) of the vehicle computing system are used most effectively by focusing on the areas around the autonomous vehicle that are important in choosing a trajectory.

To help do so, the vehicle computing system can obtain sensor data from one or more sensors included in the autonomous vehicle. The autonomous vehicle can include multiple sensors, including, but not limited to, LIDAR sensors, cameras, and radar sensors. Each sensor type gathers different information from the environment around the sensor. For example, a LIDAR sensor gathers point cloud data for the area around the sensor. The point cloud data can include a plurality of points, each point representing a beam of laser light produced by a laser, reflected back from an object in the environment of the autonomous vehicle, and measured by a sensor. Each point can have an associated position in the area of the LIDAR sensor (e.g., with an associated coordinate with x, y, and z values) and, potentially, a luminance value.

The vehicle computing system can arrange the sensor data into a voxel grid representation. Thus, for the point cloud data produced by the LIDAR, the three-dimensional space in which the point cloud data exists can be divided into a plurality of subsections. In general, each subsection can be of the same size. In addition, the point cloud data can include data produced by a plurality of sweeps of the LIDAR sensor (each sweep representing a complete rotation of the sensor) representing a period of time (e.g., all the sweeps that occur in a 0.5 second time period).

The vehicle computing system can, using one or more machine-learned models, extract feature information from the voxel grid representation of the LIDAR point cloud data as a feature map. In some examples, feature data can include low-level information about the point cloud data, including information about edges, corners, blobs, and so on.

Extracting feature data can include, using the voxel grid representation to generate an attention mask. An attention mask can include, for each point in the voxel grid representation, a value representing the importance of the data at that location with respect to navigating the autonomous vehicle. For example, locations in the oncoming lane of traffic may receive a higher scalar score than locations in a park adjacent to the autonomous vehicle. To generate the attention mask, the vehicle computing system can input the voxel grid representation of the sensor data and map data obtained from a map database to a machine-learned model. The machine-learned model can be a neural network that generates a scalar score for each spatial location in the voxel grid representation.

In some examples, the scalar values are values between 0 and 1 that can be multiplied, as part of an iterative attention application function, with the data in the voxel grid representation to down weight the data in areas that are outside the attention mask (and are thus considered to be of less importance to the vehicle computing system). The result of multiplying the feature map by the attention mask can be used as input to the function of a residual block. The output of the function (e.g., the output of a machine-learned model) can be an intermediate feature map. The voxel grid representation can be fused (e.g., by addition, concatenation, or other technique) to the intermediate feature map and used as input to another residual block. This process can be repeated a predetermined number of times (wherein the number of repetitions is part of the system design) to produce the final feature map.

The final feature map can be used to generate (using one or more machine-learned models) a planning cost volume for the area around the autonomous vehicle. In some examples, the planning cost volume can represent, for each position in the planning cost volume, a cost value representing the cost to the autonomous vehicle to enter that position. In some examples, each future time step (e.g., each 0.1 s increment) has a unique cost value. The vehicle computing system can generate a plurality of candidate trajectories. Each candidate trajectory can be assigned a total cost by matching the position of the autonomous vehicle at each time step with a corresponding cost in the planning cost volume. The total cost for all of the time steps can represent the total cost for the particular candidate trajectory. The vehicle computing system can select a trajectory to implement based on the total costs associated with the candidate trajectories. As used herein, "based on" can include being based at least in part on.

In some examples, the above processes (e.g., generating feature map data, attention mask data, and a planning cost volume) can be performed by a multi-stage machine-learned model with a plurality of stages. The multi-stage machine-learned model can be trained in an end-to-end training process, such that the model is trained based on analysis of the final output (perception data or planning cost volume data) and not the output of any particular intermediate stage.

The multi-stage machine-learned model can be trained using a joint multi-task learning objective process that trains the model based on perception, prediction, and motion planning outputs. More specifically, the multi-stage machine-learned model can include a plurality of weights and biases. The training system can determine loss data for each training cycle by determining the difference between the output of the multi-stage machine-learned model and corresponding data in the ground truth data.

For example, the multi-stage machine-learned model can generate a list of detected objects based on input training data. The training system can compare the list of detected objects to the list of objects included in the ground truth perception data associated with the input training data. The loss data can represent the difference and can be weighted based on whether the object is inside or outside the attention area in the binary attention mask.

Similarly, the loss data can be generated based on the difference between the trajectory selected by the multi-stage and the trajectory in the ground truth data. The loss data can also include a factor that increases the loss data as the size of the attention area in the binary attention mask grows (e.g., encouraging a smaller attention area). Once each factor is included to generate the loss data, the training system can update the weights associated with the multi-stage machine-learned model based on the loss data. Ultimately, the technology described herein can improve the operation of an autonomous vehicle by utilizing an attention mask associated with its motion planning function to improve the vehicle's autonomy pipeline and resulting motion control.

The following describes the technology of this disclosure within the context of an autonomous vehicle for example purposes only. As described herein, the technology described is not limited to autonomous vehicles and can be implemented within other robotic and computing systems, such as those that autonomously: perceive an environment, predict the motion of objects within the environment, and plan motion through the environment.

An autonomous vehicle can include a vehicle computing system that performs the perception, prediction, and motion planning functions described above. The vehicle computing system can also be responsible for, among other functions, creating the control signals needed to effectively control an autonomous vehicle. The vehicle computing system can include an autonomy computing system. The autonomy computing system can include one or more systems that enable the autonomous vehicle to plan and/or follow a given route, receive sensor data about the environment, perceive objects within the vehicle's surrounding environment (e.g., other vehicles), predict the motion of the objects within the surrounding environment, and generate trajectories for the vehicle to follow based on the route/perceived objects/predicted object motion. The autonomy system can output data indicative of the generated trajectories and corresponding control signals can be sent to vehicle control system(s) (e.g., acceleration, steering, braking, etc. systems) to enable the autonomous vehicle to autonomously navigate (e.g., to its target destination).

The computing system of an autonomous vehicle can include a plurality of devices (e.g., physically-connected devices, wirelessly-connected devices, virtual devices running on a physical machine, etc.) that implement a software graph architecture of the autonomous vehicle. For instance, the computing devices can implement the vehicle's autonomy software that helps allow the vehicle to autonomously operate within its environment.

To accomplish these operations, the autonomy computing system can include, for example, a perception system, a prediction system, and a motion planning system. Many of the functions performed by the perception system, prediction system, and motion planning system can be performed, in whole or in part, by one or more machine-learning models. Moreover, one or more of the perception system, prediction system, and/or motion planning system (or the functions associated therewith) can be combined into a single system and/or share computing resources.

To help maintain awareness of the vehicle's surrounding environment, the vehicle computing system can access sensor data from one or more sensors (e.g., LIDAR, RADAR, camera, etc.) to identify static objects and/or dynamic objects (actors) in the autonomous vehicle's environment. To help determine its position within the environment (and relative to these objects), the vehicle computing system can provide sensor data to a machine-learned model(s). In addition or alternatively, the autonomous vehicle can access map data (e.g., high-definition map data, etc.) to determine the autonomous vehicle's current position relative to other objects in the world (e.g., bicycles, pedestrians, other vehicles, buildings, etc.), as well as map features such as, for example, lane boundaries, curbs, and so on.

The vehicle computing system can utilize the sensor data to identify one or more objects in the local environment of the autonomous vehicle. Using this sensor data, the vehicle computing system can generate perception data that describes one or more object(s) in the vicinity of the autonomous vehicle (e.g., current location, speed, heading, shape/size, etc.).

The generated perception data can be utilized to predict the future motion of the object(s). For example, the vehicle computing system can use the perception data to generate predictions for the movement of one or more objects as an object trajectory including one or more future coordinates/points. In some implementations, the perception and prediction functions of the vehicle computing system can be included within the same system. The vehicle computing system can use the perception data, prediction data, map data, and/or other data to generate a motion plan for the vehicle.

More specifically, the vehicle computing system can use an attention system to enable the autonomous vehicle (and its associated vehicle computing system) to focus on the areas of sensor data that are most helpful/relevant for motion planning. For example, the attention system can include a data acquisition system, a mask generation system, a cost volume generation system, and a trajectory selection system.

The data acquisition system can obtain sensor data from sensors associated with the autonomous vehicle. Specifically, the data acquisition system can access point cloud data from a LIDAR system. The point cloud data includes a plurality of points, each point associated with a position in three-dimensional space defined by a set of coordinates (e.g., x, y, and z coordinates). In some examples, each point can have luminance data associated with it (e.g., how strong, or bright was the reflected laser light when it was sensed by the LIDAR sensor).

The data acquisition system can arrange the sensor data produced by the LIDAR sensor into a voxel grid representation. Thus, for the point cloud data produced by the LIDAR, the three-dimensional space in which the point cloud data exists can be divided into a plurality of subsections. In general, each subsection can be the same size and/or shape. The data acquisition system can generate a voxel grid representation of the LIDAR point cloud data. For example, the geographic area can be subdivided into a plurality of equally-sized cubes.

Voxels included in the voxel grid representation of the LIDAR point cloud data can, for each voxel, include a value that represents the contents of the voxel. In some examples, the value can be a binary value that represents whether the voxel is occupied or not. Thus, the value can be a 0 (unoccupied) or a 1 (occupied). Similarly, a Boolean true or false value can be used to represent the occupancy of the voxel. In another example, the value can be a scalar value that is representative of the number of points in the point cloud data in the voxel. As such, the scalar value can be a representation of density and be weighted based on the average distance of the points in the voxel from the sensor itself. Thus, this scalar value can be a distance-weighted density feature.

In addition, the point cloud data can include data produced by a plurality of sweeps of the LIDAR sensor (each sweep representing a complete rotation of the sensor) being associated with a period of time (e.g., all the sweeps that occur in a 0.5 second time period). In addition, the voxel grid representation can include a plurality of channels, each channel representing a separate sweep and thus being associated with a particular point in time. Thus, each channel can represent a full voxel grid representation for a particular period of time. Comparing several channels can allow the vehicle computing system as a whole to estimate the movement of objects within the area of the autonomous vehicle.

In addition, because the LIDAR sensor sweeps are generated by sensors attached to an autonomous vehicle, as the autonomous vehicle moves, the coordinate frame of the sensor data included in each sensor sweep changes. For example, a stationary mailbox may appear in front of the autonomous vehicle in a sensor sweep associated with the current time but beside or behind the autonomous vehicle in a future sensor sweep as the autonomous vehicle moves past the mailbox. As such, the vehicle computing system can transform the LIDAR point cloud data into a common coordinate frame (e.g., the current coordinate frame).

The data acquisition system can use the voxel grid representation of the LIDAR data as input to one or more machine-learned models. The one or more machine-learned models can identify feature data from the voxel grid representation of the LIDAR data. In some examples, feature data can include low-level information about the LIDAR point cloud data, including information about edges, corners, blobs, and so on. In other examples, the feature data can be non-interpretable (e.g., the models produce feature data that is used as input to other machine-learned models but is unintelligible to a human viewer).

The resulting output can be a feature map representation for the LIDAR point cloud data. A feature map representation can be a grid of values, associated with the LIDAR data. Each value in the grid of values is associated with a voxel in a voxel grid representation for the associated sensor data type and having associated feature data and representing a particular area.

The data acquisition system can transmit the voxel grid representation to the mask generation system. The voxel grid representation can represent the area around the autonomous vehicle in a bird's eye view representation. The mask generation system can use the voxel grid representation to generate an attention mask, by inputting the voxel grid representation into a machine-learned model. The machine-learned model can be a convolutional neural network (CNN) (e.g., a U-net network). The convolutional neural network can include a plurality of stages or layers. In some examples, the CNN can include skip connections which allow the output of a particular stage to be used as input to a stage that is not immediately subsequent to it.

In some examples, to reduce the computational complexity necessary to process the voxel grid representation, the mask generation system can down-sample the voxel grid representation. In addition, the convolutional neural network itself can include multiple down-sample and up-sample stages.

The CNN can generate, as output, a grid of scalar values. Each scalar value can be associated with a location in the voxel grid representation (and thereby is associated with a portion of the area around the autonomous vehicle). The scalar values can represent the degree to which the associated area of the voxel grid representation is important to accurately select an appropriate motion plan. Thus, the higher the scalar value, the greater the importance of that area of the voxel grid representation. In some examples, a plurality of grids can be generated, each grid representing a different time step. Thus, different grids are generated for different points in time.

In some examples, the mask generation system can further convert the grid of scalar values into a binary attention mask. In a binary attention mask, all the scalar values can be converted into either a one or zero. To do so, the mask generation system can convert each scalar value to a one or a zero. For example, the mask generation system can determine a threshold value. Each scalar value can be compared to the threshold value. If the scalar value exceeds or matches the threshold value, the mask generation system can set the mask value to a one. If the scalar value is less than the threshold value, the mask generation system can set the mask value to a zero.

The mask generation system can also employ the Gumbel SoftMax technique to convert each scalar value to either a one or a zero. To do so, the mask generation system can add Gumbel noise to each scalar value. In this example, i and j denote spatial coordinates and $z_{i,j}$ represent the scalar output from the CNN at i,j coordinate. Thus, Gumble noise can be added as follows:

$$\pi_{i,j} = \text{sigmoid}(z_{i,j})$$
$$\alpha_{i,j}^{(0)} = \log \pi_{i,j} + g_{i,j}^{(0)}$$
$$\alpha_{i,j}^{(1)} = \log(1 - \pi_{i,j}) + g_{i,j}^{(1)},$$

where $g_{i,j} = -\log(-\log u)$ and u is sampled from a uniform set from 0 to 1. When the inference is made, the mask generation system can generate the hard attention value (e.g., a binary value) by comparing the values as follows:

$$A_{i,j} = \begin{cases} 1 & \text{if } \alpha_{i,j}^{(0)} \geq \alpha_{i,j}^{(1)} \\ 0 & \text{otherwise.} \end{cases}$$

By using the Gumbel SoftMax technique, the mask generation system can enable differentiation to be used on this stage of the process while the CNN is being trained. The binary attention mask can be organized such that it includes binary values arranged in a grid, with each binary value associated with a particular portion of the voxel grid representation.

The binary attention mask can be transmitted to the cost map generation system. The cost map generation can up-sample the binary attention mask to the same resolution as the voxel grid representation. The binary attention mask can be applied to the voxel grid representation to create a sparse feature map. In some examples, applying a binary attention mask to the voxel grid representation includes multiplying the voxel grid representation with the binary attention mask. In this example, the voxel grid representation and the binary attention mask are multiplied elementwise. Element wise multiplication includes multiplying each value in the voxel grid representation with its corresponding value in the binary attention mask. In some examples, because all the values in the binary attention mask are either one or zero, element wise multiplication will result in either the voxel grid representation values being set to zero or remaining unchanged. In this way, data associated with areas outside the attention mask can be reduced to zero while the rest of the data remains unchanged.

The sparse feature map can be used as input to one or more machine-learned models as part of a residual block. The residual block outputs an intermediate version of the feature map, denoted herein as an attention weighted feature map. The attention weighted feature map can then be added back with the voxel grid representation data. For example, the attention weighted feature map can be concatenated with the voxel grid representation. In other examples, the attention weighted feature map can be added element wise to the voxel grid representation to generate an intermediate feature map.

The intermediate feature map can be used as input to a subsequent residual block. If so, it can again be multiplied with the binary attention mask. The cost map generation system can be designed to repeat any number of times and will include that number of residual blocks. Once the total number of residual block cycles have been completed, the output of the cost map generation system can be a final attention weighted feature map.

The final attention weighted feature map can be used by the cost map generation system as input to one or more machine learned models. The machine-learned model(s) can use the final attention weighted feature map to generate perception and prediction data. For example, the perception and prediction data can include a listing of detected objects, their location, size, orientation, and velocity. It can also include predicted movement for those objects in the future.

This perception and prediction data can be used to train the other aspects of the system (e.g., models for generating the feature map, models for generating the binary attention mask, and models for generating the planning cost volume). In addition, the perception and prediction data can be used by other components of the vehicle computing system (e.g., fail-safe mechanisms, etc.). In some examples, the planning cost volume can be used to generate trajectories and the perception and prediction data is not used for while performing the motion planning function of the autonomous vehicle.

The planning cost volume can be a three-dimensional (H×W×T) grid, where H and W represent spatial dimensions in the bird's eye view representation of the area around the autonomous vehicle and T represents different layers, each layer representing a particular point in time (or time step). The number of time (T) layers can be based on the planning horizon of the autonomous vehicle (e.g., how far into the future the autonomous vehicle plans its trajectories).

In some examples, the cost volume has, for each point in the three-dimensional grid, a cost associated with that H W position at time T. The cost value associated with each point in the three-dimensional map can represent the cost associated with the autonomous vehicle moving into that location at that time (T). A higher cost can indicate that the position is less good. Goodness can be defined as the degree to which it matches the actions of a human driver. Other measurements of goodness can be represented by the cost value such as achieving a reduction in the likelihood of an accident, observing rules of the road, maintaining safe distances from obstacles, etc.

The trajectory selection system can use the planning cost volume to select a trajectory for the autonomous vehicle. To do so, the trajectory selection system can generate a plurality of candidate trajectories. Each candidate trajectory includes a series of waypoints, each waypoint describing a position and a time. The trajectory selection system can use the series of waypoints and the planning cost volume to generate a total cost for each candidate trajectory.

For each candidate trajectory, the trajectory selection system can identify a cost for each waypoint in the series of waypoints. To identify a cost for a particular waypoint, the trajectory selections system can determine the location of the waypoint and the time associated with the waypoint. Using this information, the trajectory selection system can look up the associated cost in the planning cost volume. The costs for each waypoint can be aggregated (e.g., summed) to generate the total cost for the candidate trajectory. For example, the aggregation can be represented as follows:

$$c(\tau, X) = \sum_{t=1}^{T} C_{t,x_t,y_t}(X).$$

Once the attention system has selected a trajectory for the autonomous vehicle, the vehicle computing system can generate signals or commands to send to the control systems of the autonomous vehicle to implement the selected trajectory. The autonomy system can output data indicative of the generated trajectories and corresponding control signals can be sent to vehicle control system(s) (e.g., acceleration, steering, braking, etc. systems) to enable the autonomous vehicle to autonomously navigate (e.g., to its target destination).

In some examples, the above processes (e.g., generating feature map data, attention mask data, and a planning cost volume) can be performed by a multi-stage machine-learned model with a plurality of stages. The multi-stage machine-learned model can be trained in an end-to-end process, such that the model is trained based on analysis of the final output (perception data or planning cost volume data) and not the output of any intermediate stage. The multi-stage machine-learned model can include a plurality of weights and biases.

In addition, the multi-stage machine-learned model can be trained using a joint multi-task learning objective process that trains the model based on perception, prediction, and motion planning outputs. For example, the loss associated with a particular iteration of training the machine-learned model can be calculated as follows:

$$\mathcal{L} = \lambda_{class}\mathcal{L}_{class} + \lambda_{reg}\mathcal{L}_{reg} + |\lambda_{plan}\mathcal{L}_{plan} + \lambda_A \mathcal{L}_A + \lambda\|\omega\|_2^2,$$

where $\mathcal{L}_\lambda$ is a L1 loss that controls the sparsity of the attention mask, and $\|\omega\|_2^2$ is the standard weight decay term.

Each component of the loss data can represent a particular task in the multi-task learning process. One component of the loss data can reduce the effect of error for areas of the feature map/voxel grid representation that are not included in the attention area of the binary attention mask. The losses associated with the perception and prediction functions can be re-weighted as follows:

$$\mathcal{L}_{class} = \gamma_1 \sum_{i,j} A_{i,j}\mathcal{L}_{class,i,j} + \gamma_0 \sum_{i,j}(1-A_{i,j})\mathcal{L}_{class,i,j},$$

$$\mathcal{L}_{reg} = \gamma_1 \sum_{i,j} A_{i,j}\mathcal{L}_{reg,i,j} + \gamma_0 \sum_{i,j}(1-A_{i,j})\mathcal{L}_{reg,i,j},$$

where $\gamma_1$ is the weighting for attended instances, and $\gamma_0$ for unattended ones, and the experiment fixes $\gamma_0=0.1$ and $\gamma_1=0.9$.

Similarly, the prediction and perception loss score can be calculated as follows:

$$\mathcal{L}_{class,i,j} = \sum_{k} -\hat{y}_{i,j,k}\log(y_{i,j,k}) - (1-\hat{y}_{i,j,k})\log y_{i,j,k},$$

where y is a predicted classification score between 0 and 1, and y is the binary ground truth. For each detected instance of an object, the model outputs a bounding box (x, y, w, h), and a pair of coordinates and angles for each future step. The distance between a predicted object's bounding box and the ground truth bounding box can be 6-dimensional vector as follows:

$$\delta_t = \left(\frac{x_a - x}{w}, \frac{y_a - y}{h}, \log \frac{w_a}{w}, \log \frac{h_a}{h}, \sin(\theta_a - \theta), \cos(\theta_a - \theta)\right).$$

The loss can then be applied for a trajectory of the object up to a time T. For each spatial coordinate (i,j), the system can aggregate the losses for all objects that below to a particular location as follows:

$$\mathcal{L}_{reg,i,j} = \sum_{b \in (i,j)} \sum_{t=0}^{T} SmoothL1(\hat{\delta}_{b,t}, \delta_{b,t}),$$

wherein $\hat{\delta}$ is the model predicted shifts and $\delta$ is the ground truth shifts The loss data can also include a motion planning loss, which represents the difference in cost of the ground truth trajectory as evaluated by the planning cost volume and one or more lowest cost trajectories selected by the multi-stage network. For example, that difference can be calculated as follows:

$$\mathcal{L}_{plan} = \max_{i=1 \ldots N} \sum_{t=0}^{T} \max\{0, c_t - c_t^{(i)} + \Delta_t^{(i)}\},$$

where $\Delta_t^{(i)}$ is the task loss that captures spatial position differences and traffic rule violations encoded in binary values as follows:

$$\Delta_t^{(i)} = \|(x_t, y_t) - (x_t^{(i)}, y_t^{(i)})\|_2 + v_t^{(i)}.$$

In addition, the loss data can include a factor that encourages the multi-stage machine-learned model to have a more tightly focused (smaller) attention area. For example, an attention sparsity loss factor can be calculated as:

$$\mathcal{L}_{\tilde{A}} = \sum_{i,j} \tilde{A}_{i,j}.$$

which introduces a loss proportionate to the number of points outside the attention area of the binary attention mask. The above factors can be included in the loss calculation and applied to alter the weights and biases of the multi-stage machine-learned model at each stage.

The following provides an end-to-end example of the technology described herein. An autonomous vehicle can include a vehicle computing system. The vehicle computing system can access sensor data and map data for an area around the autonomous vehicle. In some examples, the LIDAR sensor data includes a plurality of LIDAR points, each LIDAR point having an associated location. In some examples, sensor data includes data from a plurality of sweeps of the LIDAR sensor.

In some examples, the map data can include data describing, among other things, lanes, boundaries, crossing areas, and traffic control mechanisms (e.g., stop signs, traffic lights, etc.). The map data can be rasterized such that important aspects of the map data can be made more distinct. In some examples, the map data can be presented from a bird's eye view perspective.

In some examples, the vehicle computing system can generate a voxel grid representation of the sensor data and map data. Thus, for the point cloud data produced by the LIDAR, the three-dimensional space in which the point cloud data exists can be divided into a plurality of subsections. In general, each subsection can be of the same size. In addition, the point cloud data can include data produced by a plurality of sweeps of the LIDAR sensor (each sweep representing a complete rotation of the sensor) representing a period of time (e.g., all the sweeps that occur in a 0.5 second time period).

In some examples, the vehicle computing system can generate an attention mask based on the voxel grid representation. The attention mask can represent which areas of the voxel grid representation should receive most of the attention of the vehicle computing system. In some examples, the attention mask includes a grid of attention values, each respective attention value associated with a particular location in the voxel grid representation. In some examples, the attention value is a scalar value. In some examples, the scalar values are associated with the importance associated with the associated location of the voxel grid representation. In some examples, importance can also be referred to as usefulness. Thus, a model can be trained to generate scalar values based on whether the resulting motion plans are accurate to ground truth data. Thus, scalar values can represent the degree to which prioritizing the associated areas of the voxel grid representation results in accurate and useful motion plans based on predetermined training data.

In some examples, the scalar values can be between 0 and 1 (or can be normalized to a value between 0 and 1). In some examples, for each respective scalar value, the vehicle computing system determines whether the respective scalar value exceeds a predetermined threshold value. The predetermined threshold value can be, for example, 0.5.

In some examples, in accordance with a determination that the respective scalar value exceeds the predetermined threshold value, the vehicle computing system can set the respective scalar value to one. In accordance with a determination that the respective scalar value does not exceed the predetermined threshold value, the vehicle computing system can set the respective scalar value to zero.

In some examples, the vehicle computing system can generate, by using the voxel grid representation and the attention mask as input to a machine-learned model, an attention weighted feature map. To do so, the vehicle computing system can generate a sparse feature map by multiplying the voxel grid representation and the attention mask. The vehicle computing system can receive the attention weighted feature map as output from one or more machine-learned models using the sparse feature map and the attention mask as input.

In some examples, the vehicle computing system generates an attention weighted feature map by concatenating, by the computing system, the attention weighted feature map with the voxel grid representation. In some examples, the vehicle computing system can generate a list of detected objects based, at least in part, on the attention weighted feature map.

In some examples, the vehicle computing system can determine, using the attention weighted feature map, a planning cost volume for an area around the autonomous vehicle. In some examples, the planning cost volume can include a cost associated with each position in the planning cost volume. In some examples, the planning cost volume includes costs associated with each position and time step described by the planning cost volume.

In some examples, the vehicle computing system can select a trajectory for the autonomous vehicle based, at least in part, on the planning cost volume. To do so, the vehicle computing system can generate a plurality of candidate trajectories for the autonomous vehicle, each candidate trajectory including a series of points that represent the route of the autonomous vehicle through the area around the autonomous vehicle and each point is associated with a particular point in time.

For a respective candidate trajectory in the plurality of candidate trajectories, the vehicle computing system can determine a cost for each respective point in the series of points associated with the respective trajectory by using the location of the respective point and the time associated with the point to identify the predicted cost of the point in the cost volume map. The vehicle computing system can aggregate the costs for each position in the series of positions into a total cost associated with the respective candidate trajectory. The vehicle computing system can select the candidate trajectory with the lowest total cost.

In some examples, a model training system can provide, by a computing system with one or more processors, a set of training sensor data as input to one or more machine-learned models in a motion planning system, the machine-learned models included a set of weights. The model training system can receive as output from the one or more machine-learned models, perception and prediction data and a binary attention mask. The computing system performing the training can be remote from the autonomous vehicle and/or onboard the autonomous vehicle.

The model training system can generate perception loss data by determining a difference between the perception and prediction data received from the one or more machine-learned models and predetermined ground truth data associated with the training sensor data. The model training system can modify the perception loss data based on the binary attention mask. The model training system can update the set of weights included in the one or more machine-learned models based on the modified perception loss data.

The model training system can receive as output from the one or more machine-learned models, a planning cost volume. The model training system can determine cost loss data based on the difference between the planning cost volume and a trajectory selected by a human operator in response to the set of training data.

The model training system can update the set of weights based on more two or more loss measurements, including perception loss data and cost loss data. The model training system can determine, for each object in the predetermined ground truth data; whether the object is within the attention area defined by the binary attention mask. The model training system can down weight loss data associated with objects that are determined to be outside the attention area defined by the binary attention mask.

The model training system can update the set of weights based, at least in part, on an attention size factor. In some examples, the attention size factor can increase the determined loss as the size of the attention area in the binary attention mask updates.

Various means can be configured to perform the methods and processes described herein. For example, a computing system can include data obtaining units(s), grid generation units(s), masking units(s), feature identification unit(s), cost volume unit(s), selection unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to access sensor data and map data for an area around the autonomous vehicle. For example, a vehicle computing system can receive sensor data from a LIDAR sensor and map data that describes geographic features of the area around the autonomous vehicle. A data obtaining unit is one example of a means for accessing sensor data and map data for an area around the autonomous vehicle.

The means can be configured to generate a voxel grid representation of the sensor data and map data. For example, the vehicle computing system can generate a voxel representation of the LIDAR data and rasterized map. A grid generation unit is one example of a means for generating a voxel grid representation of the sensor data and map data.

The means can be configured to generate an attention mask based on the voxel grid representation. For example, the vehicle computing system can, using a machine-learned model, generate attention values for each location in the voxel grid representation. Each location that has an attention value above a predetermined threshold value will be assigned a value of one and locations with an attention value below the predetermined threshold will be assigned a value of zero. A masking unit is one example of a means for generating an attention mask based on the voxel grid representation.

The means can be configured to generate, using the voxel grid representation and the attention mask as input to a machine-learned model, an attention weighted feature map. For example, the vehicle computing system can elementwise multiply the voxel grid representation and the attention mask and use the result as input to a data acquisition system. A feature identification unit is one example of a means for generating, using the voxel grid representation and the attention mask as input to a machine-learned model, an attention weighted feature map.

The means can be configured to determine, using the attention weighted feature map, a planning cost volume for an area around the autonomous vehicle. For example, the vehicle computing system can generate a cost volume, the cost volume includes a grid of costs, each grid point associated with a particular location and a particular time. A cost volume unit is one example of a means for determining using the attention weighted feature map, a planning cost volume for an area around the autonomous vehicle.

The means can be configured to select a trajectory for the autonomous vehicle based, at least in part, on the planning cost volume. For example, the vehicle computing system can select the candidate trajectory with the lowest total cost. A selection unit is one example of a means for selecting a trajectory for the autonomous vehicle based, at least in part, on the planning cost volume.

The systems and methods described herein provide a number of technical effects and benefits. More particularly, the systems and methods of the present disclosure provide improved techniques for motion planning by focusing the attention of the autonomous vehicle on the most relevant areas by use of a binary attention mask. Specifically, the vehicle computing system can generate attention masks that allow the autonomous vehicle to more efficiently select trajectories based on costs. Doing so allows the vehicle computing system to perform motion planning efficiently and avoid the time-consuming and costly calculations that result from focusing on less relevant parts of the LIDAR data. As a result, the vehicle computing system can more efficiently detect objects, predict their trajectories, and select an appropriate trajectory. This results in a reduction in the number of processing cycles necessary, reducing the amount of data storage needed, and reducing the amount of energy used by the system. Reducing energy consumption also increases the useful battery life of any battery systems included in the autonomous vehicle. Furthermore, improving the capabilities of the detection, prediction, and motion planning functions can allow the autonomous vehicle to travel more safely.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

With reference to the figures, example embodiments of the present disclosure will be discussed in further detail.

FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a lightweight elective vehicle (e.g., bicycle, scooter, etc.). The vehicle 105 can be another type of vehicle (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 140 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via different sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that are within the surrounding environment of the vehicle 105 based at least in part on the sensor data 155 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more waypoints (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The motion planning system 170C can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 170C can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and corresponding planned vehicle motion trajectories. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 15. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190A (e.g., its one or more processors, etc.) to perform operations and functions, such as those described herein matching users and vehicles/vehicle fleets, deploying vehicles, facilitating the provision of vehicle services via autonomous vehicles, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 195 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 125. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2A:
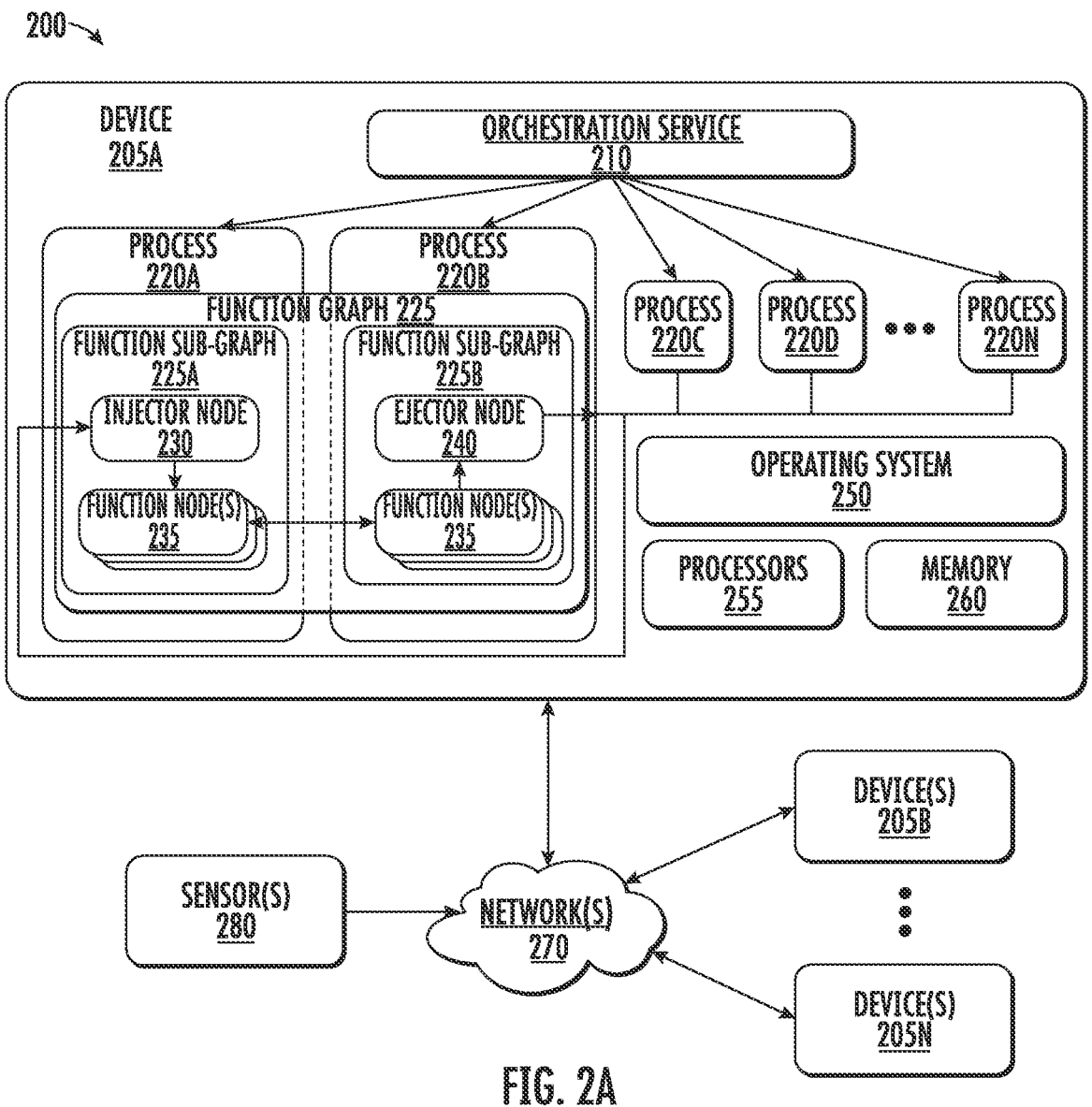
FIG. 2A depicts a diagram of an example system including a plurality of devices configured to execute one or more processes according to example implementations of the present disclosure.

FIG. 2A depicts a diagram of an example computing system 200 including one or more of the plurality of devices (e.g., plurality of devices 205A-N) of the computing system of the present disclosure. The plurality of devices 205A-N can include one or more devices configured to communicate over one or more wired and/or wireless communication channels (e.g., wired and/or wireless networks). Each device (e.g., 205A) can be associated with a type, an operating system 250, and/or one or more designated tasks. A type, for example, can include an indication of the one or more designated tasks of a respective device 205A. The one or more designated tasks, for example, can include performing one or more processes 220A-N and/or services of the computing system 200.

Each device 205A of the plurality of devices 205A-N can include and/or have access to one or more processors 255 and/or one or more memories 260 (e.g., RAM memory, ROM memory, cache memory, flash memory, etc.). The one or more memories 260 can include one or more tangible non-transitory computer readable instructions that, when executed by the one or more processors 255, cause the device 205A to perform one or more operations. The operations can include, for example, executing one or more of a plurality of processes of the computing system 200. For instance, each device 205A can include a compute node configured to run one or more processes 220A-N of the plurality of processes.

For example, the device 205A can include an orchestration service 210. The orchestration service 210 can include a start-up process of the device 205A. The orchestration service 210, for example, can include an operating system service (e.g., a service running as part of the operating system 250). In addition, or alternatively, the orchestration service can include a gRPC service. The device 205A can run the orchestration service 210 to configure and start processes 220A-220N of the device 205A. In some implementations, the orchestration service 210 can include a primary orchestrator and/or at least one of a plurality of secondary orchestrators. For example, each respective device of the plurality of devices can include at least one of the plurality of secondary orchestrators. The primary orchestrator can be configured to receive global configuration data and provide the global configuration data to the plurality of secondary orchestrators. The global configuration data, for example, can include one or more instructions indicative of the one or more designated tasks for each respective device(s) 205A-N, a software version and/or environment on which to run a plurality of processes (e.g., 220A-220N of the device 205A) of the computing system 200, etc. A secondary orchestrator for each respective device can receive the global configuration data and configure and start one or more processes at the respective device based on the global configuration data.

For instance, each process (e.g., process 220A, 220B) can include a plurality of function nodes 235 (e.g., pure functions) connected by one or more directed edges that dictate the flow of data between the plurality of function nodes 235. Each device 205A can execute (e.g., via one or more processors, etc.) a respective plurality of function nodes 235 to run a respective process 220A, 220B. For example, the plurality of function nodes 235 can be arranged in one or more function graphs 225. A function graph 225 can include a plurality of (e.g., series of) function nodes 235 arranged (e.g., by one or more directed edges) in a pipeline, graph architecture, etc.

Figure 2B:
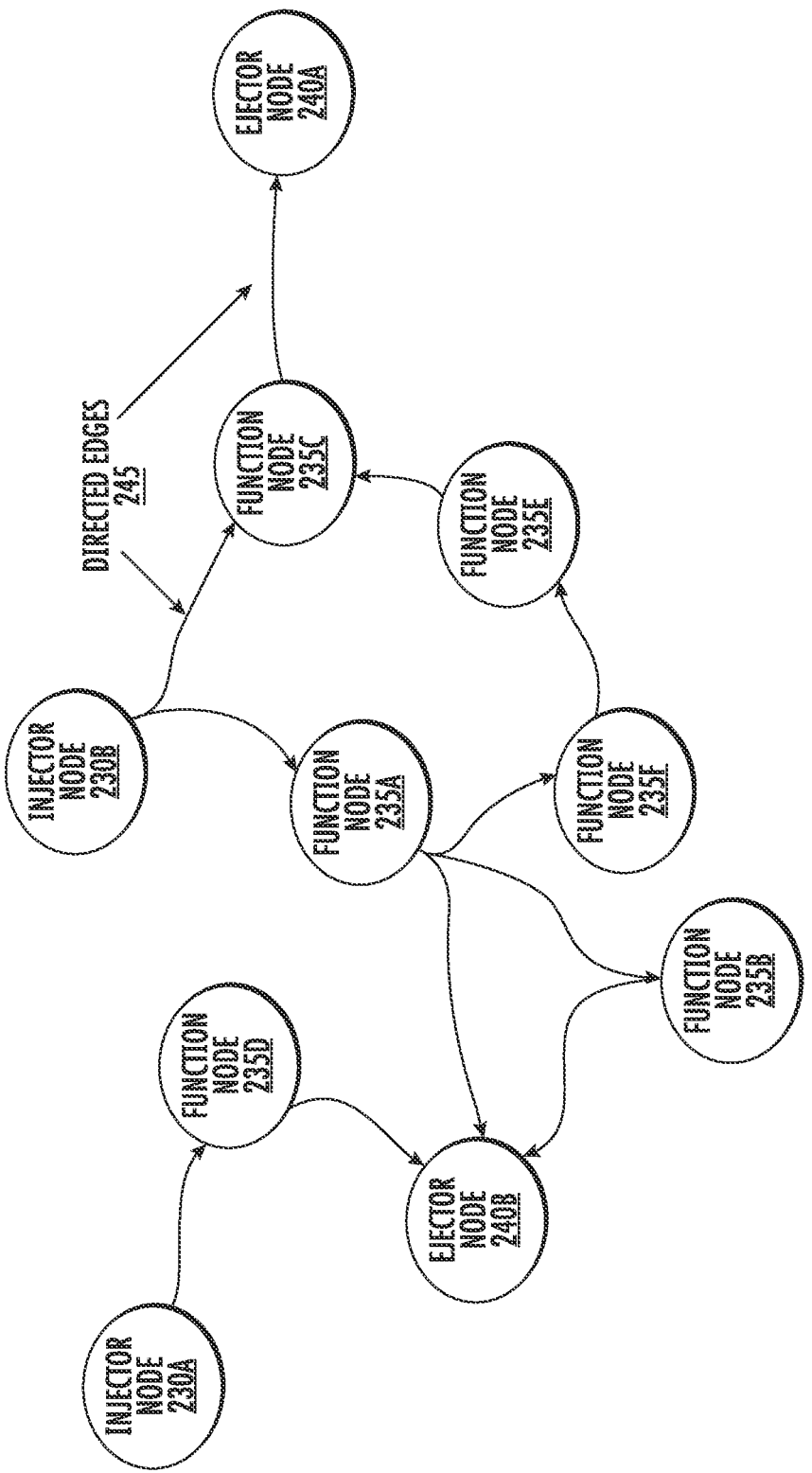
FIG. 2B depicts a diagram of an example functional graph according to example implementations of the present disclosure.

For example, with reference to FIG. 2B, FIG. 2B depicts a diagram of an example functional graph 225 according to example implementations of the present disclosure. The function graph 225 can include a plurality of function nodes 235A-F, one or more injector nodes 230A-B, one or more ejector nodes 240A-B, and/or one or more directed edges 245. The function nodes 235 can include one or more computing functions with one or more inputs (e.g., of one or more data types) and one or more outputs (e.g., of one or more data types). For example, the function nodes 235A-F can be implemented such that they define one or more accepted inputs and one or more outputs. In some implementations, each function node 235A-F can be configured to obtain one or more inputs of a single data type, perform one or more functions on the one or more inputs, and output one or more outputs of a single data type.

Each function node of the plurality of function nodes 235A-F can be arranged in a directed graph architecture (e.g., including a plurality of function graphs) and can be configured to obtain function input data associated with an autonomous vehicle based on the one or more directed edges 245 (e.g., of the directed graph 225). For instance, the function nodes 235A-F can be connected by one or more directed edges 245 of the function graph 225 (and/or a subgraph 225A, 225B of the function graph 225 with reference to FIG. 2A). The one or more directed edges 245 can dictate how data flows through the function graph 225 (and/or the subgraphs 225A, 225B of FIG. 2A). For example, the one or more directed edges 245 can be formed based on the defined inputs and outputs of each of the function nodes 235A-F of the function graph 225. The function nodes 235A-F can generate function output data based on the function input data. For instance, the function nodes 235A-F can perform one or more functions of the autonomous vehicle on the function input data to obtain the function output data. The function nodes 235A-F can communicate the function output data to one or more other function nodes of the plurality of function nodes 235A-F based on the one or more directed edges 245 of the directed graph 225.

In addition, or alternatively, each function graph 225 can include one or more injector nodes 230A-B and one or more ejector nodes 240A-B configured to communicate with one or more remote devices and/or processes (e.g., processes 220C-220N of FIG. 2A) outside the function graph 225. The injector nodes 230A-B, for example, can be configured to communicate with one or more devices and/or processes (e.g., processes 220C-220N of FIG. 2A) outside the function graph 225 to obtain input data for the function graph 225. By way of example, each of the one or more injector nodes 230A-B can include a function configured to obtain and/or process sensor data from a respective sensor 280 shown in FIG. 2A (e.g., sensor(s) 135 of FIG. 1). The ejector nodes 240A-B can be configured to communicate with one or more devices 205B-N and/or processes 220C-220N outside the function graph 225 to provide function output data of the function graph 225 to the one or more devices 205B-N and/or processes 220C-220N.

Turning back to FIG. 2A, each device 205A-N can be configured to execute one or more function graphs 225 to run one or more processes 220A, 220B of the plurality of processes 220A-N of the respective device 205A. For example, as described herein, each respective device can be configured to run a respective set of processes based on global configuration data. Each process 220A-N can include an executed instance of a function graph and/or a subgraph of a function graph. For example, in some implementations, a function graph 225 can be separated across multiple processes 220A, 220B. Each process 220A, 220B can include a subgraph 225A, 225B (e.g., process 220A including subgraph 225A, process 220B including subgraph 225B, etc.) of the function graph 225. In such a case, each process 220A, 220B of the function graph 225 can be communicatively connected by one or more function nodes 235 of the function graph 225. In this manner, each respective device 205A-N can be configured to run a respective process by executing a respective function graph and/or a subgraph of the respective function graph. Thus, each function graph can be implemented as a single process or multiple processes. For instance, the messages communicated between nodes of a sub-graph dedicated to motion planning for an autonomous vehicle can help identify a nominal path for the vehicle given the area/environment in which the vehicle is operating, motion constraints, costs, vehicle trajectories, etc.

In some implementations, one or more of the plurality of processes 220A-N can include containerized services (application containers, etc.). For instance, each process 220A-N can be implemented as a container (e.g., docker containers, etc.). For example, the plurality of processes 220A-N can include one or more containerized processes abstracted away from an operating system 250 associated with each respective device 205A. As an example, the containerized processes can be run in docker containers, such that each process is run and authorized in isolation. For example, each respective container can include one or more designated computing resources (e.g., processing power, memory locations, etc.) devoted to processes configured to run within the respective container. Moreover, in some implementations, each container can include an isolated runtime configuration (e.g., software model, etc.). In this manner, each container can independently run processes within a container specific runtime environment.

The plurality of devices 205A-N, sensors 280, processes 220A-N, etc. of the computing system 200 (e.g., the plurality of processes of the vehicle computing system 110, a plurality of processes of the one or more remote devices, etc.) can be communicatively connected over one or more wireless and/or wired networks 270. For instance, the plurality of devices 205A-N (and/or processes 220A-N of device 205A) can communicate over one or more communication channels. Each device and/or process can exchange messages over the one or more communicative channels using a message interchange format (e.g., JSON, IDL, etc.). By way of example, a respective process can utilize one or more communication protocols (e.g., HTTP, REST, gRPC, etc.) to provide and/or receive messages from one or more respective device processes (e.g., other processes running on the same device) and/or remote processes (e.g., processes running on one or more other devices of the computing system). In this manner, devices can be configured to communicate messages between one or more devices, services, and/or other processes to carry out one or more tasks. The messages, for example, can include function output data associated with a respective function node (e.g., 235).

Figure 3:
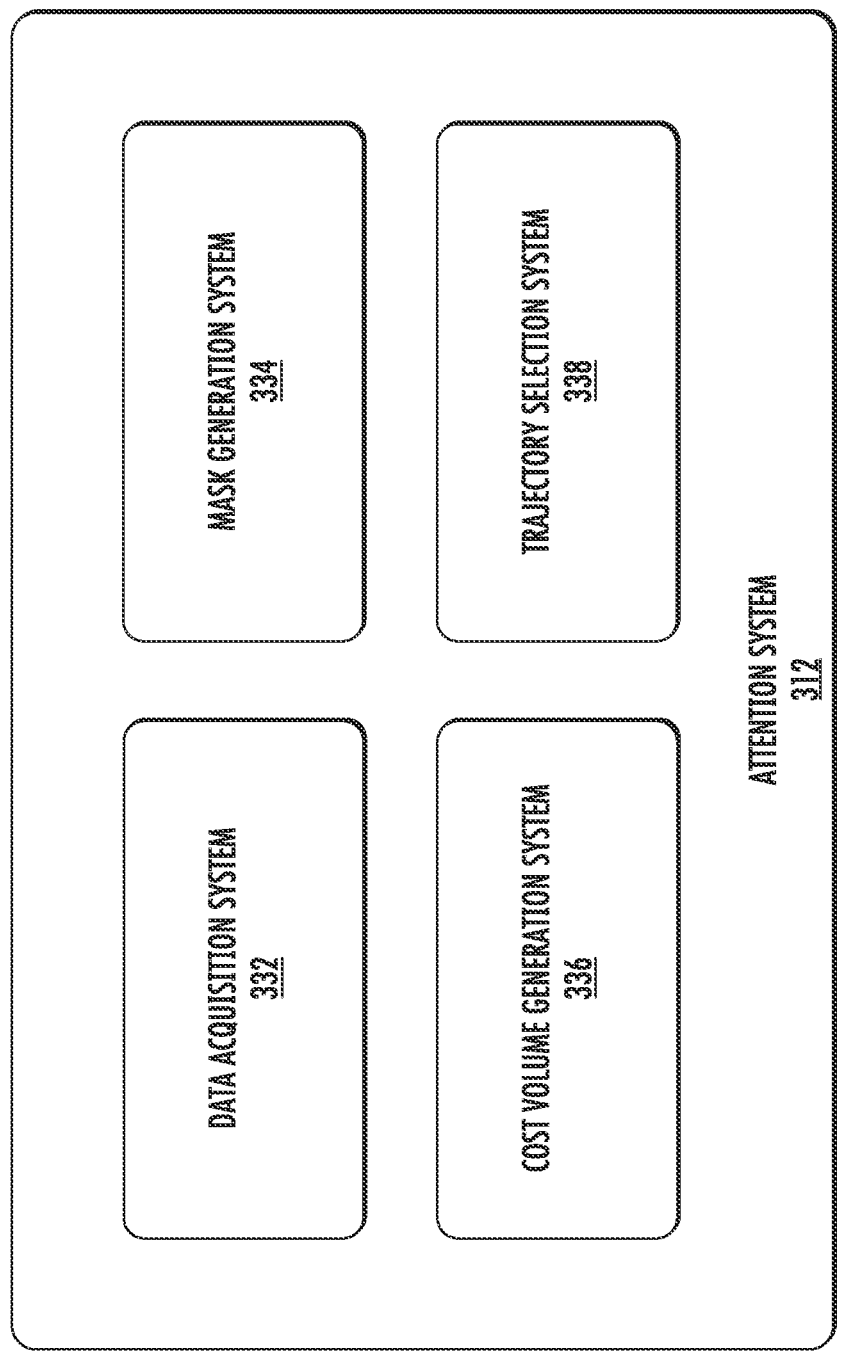
FIG. 3 depicts a block diagram of an example attention system according to example embodiments of the present disclosure.

FIG. 3 depicts a block diagram of an example attention system 312 according to example embodiments of the present disclosure. In some examples, the vehicle computing system (e.g., vehicle computing system 110 in FIG. 1) can include an attention system 312 that uses an attention mask to improve the sensor data from both the LIDAR sensor and the radar sensor to accurately perceive objects in the environment of the autonomous vehicle (e.g., autonomous vehicle 105 in FIG. 1). More specifically, the vehicle computing system (e.g., vehicle computing system 110 in FIG. 1) can use an attention system 312 to enable the autonomous vehicle (e.g., autonomous vehicle 105 in FIG. 1) (and its associated vehicle computing system (e.g., vehicle computing system 110 in FIG. 1)) to focus on the areas of sensor data that are most helpful/relevant for motion planning. For example, the attention system 312 can include a data acquisition system 332, a mask generation system 334, a cost volume generation system 336, and a trajectory selection system 338.

The data acquisition system 332 can obtain sensor data from sensors associated with the autonomous vehicle (e.g., autonomous vehicle 105 in FIG. 1). Specifically, the data acquisition system 332 can access point cloud data from a LIDAR system. The point cloud data includes a plurality of points, each point associated with a position in three-dimensional space defined by a set of coordinates (e.g., x, y, and z coordinates). In some examples, each point can have luminance data associated with it (e.g., how strong, or bright was the reflected laser light when it was sensed by the LIDAR sensor).

The data acquisition system 332 can arrange the sensor data produced by the LIDAR sensor into a voxel grid representation. Thus, for the point cloud data produced by the LIDAR, the three-dimensional space in which the point cloud data exists can be divided into a plurality of subsections. In general, each subsection can be the same size and/or shape. The data acquisition system 332 can generate a voxel grid representation of the LIDAR point cloud data. For example, the geographic area can be subdivided into a plurality of equally-sized cubes.

Voxels included in the voxel grid representation of the LIDAR point cloud data can, for each voxel, include a value that represents the contents of the voxel. In some examples, the value can be a binary value that represents whether the voxel is occupied or not. Thus, the value can be a 0 (unoccupied) or a 1 (occupied). Similarly, a Boolean true or false value can be used to represent the occupancy of the voxel. In another example, the value can be a scalar value that is representative of the number of points in the point cloud data in the voxel. As such, the scalar value can be a representation of density and be weighted based on the average distance of the points in the voxel from the sensor itself. Thus, this scalar value can be a distance-weighted density feature.

In addition, the point cloud data can include data produced by a plurality of sweeps of the LIDAR sensor (each sweep representing a complete rotation of the sensor) being associated with a period of time (e.g., all the sweeps that occur in a 0.5 second time period). In addition, the voxel grid representation can include a plurality of channels, each channel representing a separate sweep and thus being associated with a particular point in time. Thus, each channel can represent a full voxel grid representation for a particular period of time. Comparing several channels can allow the vehicle computing system as a whole to estimate the movement of objects within the area of the autonomous vehicle (e.g., autonomous vehicle 105 in FIG. 1).

In addition, because the LIDAR sensor sweeps are generated by sensors attached to an autonomous vehicle (e.g., autonomous vehicle 105 in FIG. 1), as the autonomous vehicle (e.g., autonomous vehicle 105 in FIG. 1) moves, the coordinate frame of the sensor data included in each sensor sweep changes. For example, a stationary mailbox may appear in front of the autonomous vehicle (e.g., autonomous vehicle 105 in FIG. 1) in a sensor sweep associated with the current time but beside or behind the autonomous vehicle (e.g., autonomous vehicle 105 in FIG. 1) in a future sensor sweep as the autonomous vehicle (e.g., autonomous vehicle 105 in FIG. 1) moves past the mailbox. As such, the vehicle computing system (e.g., vehicle computing system 110 in FIG. 1) can transform the LIDAR point cloud data into a common coordinate frame (e.g., the current coordinate frame).

The data acquisition system 332 can use the voxel grid representation of the LIDAR data as input to one or more machine-learned models. The one or more machine-learned models can identify feature data from the voxel grid representation of the LIDAR data. In some examples, feature data can include low-level information about the LIDAR point cloud data, including information about edges, corners, blobs, and so on. In other examples, the feature data can be non-interpretable (e.g., the models produce feature data that is used as input to other machine-learned models but is unintelligible to a human viewer).

The resulting output can be a feature map representation for the LIDAR point cloud data. A feature map representation can be a grid of values, associated with the LIDAR data. Each value in the grid of values is associated with a voxel in a voxel grid representation for the associated sensor data type and having associated feature data and representing a particular area.

The data acquisition system 332 can transmit the voxel grid representation to the mask generation system 334. The voxel grid representation can represent the area around the autonomous vehicle in a bird's eye view representation. The mask generation system 334 can use the voxel grid representation to generate an attention mask, by inputting the voxel grid representation into a machine-learned model. The machine-learned model can be a convolutional neural network (CNN) (e.g., a U-net network). The convolutional neural network can include a plurality of stages or layers. In some examples, the CNN can include skip connections which allow the output of a particular stage to be used as input to a stage that is not immediately subsequent to it.

In some examples, to reduce the computational complexity necessary to process the voxel grid representation, the mask generation system 334 can down-sample the voxel grid representation. In addition, the convolutional neural network itself can include multiple down-sample and up-sample stages.

The CNN can generate, as output, a grid of scalar values. Each scalar value can be associated with a location in the voxel grid representation (and thereby is associated with a portion of the area around the autonomous vehicle (e.g., autonomous vehicle 105 in FIG. 1)). The scalar values can represent the degree to which the associated area of the voxel grid representation is important to accurately select an appropriate motion plan. Thus, the higher the scalar value, the greater the importance of that area of the voxel grid representation. In some examples, a plurality of grids can be generated, each grid representing a different time step. Thus, different grids are generated for different points in time.

In some examples, the mask generation system 334 can further convert the grid of scalar values into a binary attention mask. In a binary attention mask, all the scalar values can be converted into either a one or zero. To do so, the mask generation system 334 can convert each scalar value to a one or a zero. For example, the mask generation system 334 can determine a threshold value. Each scalar value can be compared to the threshold value. If the scalar value exceeds or matches the threshold value, the mask generation system 334 can set the mask value to a one. If the scalar value is less than the threshold value, the mask generation system 334 can set the mask value to a zero.

The mask generation system 334 can also employ the Gumbel SoftMax technique to convert each scalar value to either a one or a zero. To do so, the mask generation system 334 can add Gumbel noise to each scalar value. In this example, i and j denote spatial coordinates and $z_{i,j}$ represent the scalar output from the CNN at i, j coordinate. Thus, Gumble noise can be added as follows:

$$\pi_{i,j} = \text{sigmoid}(z_{i,j})$$
$$\alpha_{i,j}^{(0)} = \log \pi_{i,j} + g_{i,j}^{(0)}$$
$$\alpha_{i,j}^{(1)} = \log(1 - \pi_{i,j}) + g_{i,j}^{(1)},$$

where $g_{i,j} = -\log(-\log u)$ and u is sampled from a uniform set from 0 to 1. When the inference is made, the mask generation system 334 can generate the hard attention value (e.g., a binary value) by comparing the values as follows:

$$A_{i,j} = \begin{cases} 1 & \text{if } \alpha_{i,j}^{(0)} \geq \alpha_{i,j}^{(1)} \\ 0 & \text{otherwise.} \end{cases}$$

By using the Gumbel SoftMax technique, the mask generation system 334 can enable differentiation to be used on this stage of the process while the CNN is being trained. The binary attention mask can be organized such that it includes binary values arranged in a grid, with each binary value associated with a particular portion of the voxel grid representation.

The binary attention mask can be transmitted to the cost map generation system. The cost volume generation system 336 can up-sample the binary attention mask to the same resolution as the voxel grid representation. The binary attention mask can be applied to the voxel grid representation to create a sparse feature map. In some examples, applying a binary attention mask to the voxel grid representation includes multiplying the voxel grid representation with the binary attention mask. In this example, the voxel grid representation and the binary attention mask are multiplied elementwise. Element wise multiplication includes multiplying each value in the voxel grid representation with its corresponding value in the binary attention mask. In some examples, because all the values in the binary attention mask are either one or zero, element wise multiplication will result in either the voxel grid representation values being set to zero or remaining unchanged. In this way, data associated with areas outside the attention mask can be reduced to zero while the rest of the data remains unchanged.

The sparse feature map can be used as input to one or more machine-learned models as part of a residual block. The residual block track output an intermediate version of the feature map, denoted herein as an attention weighted feature map. The attention weighted feature map can then be added back with the voxel grid representation data. For example, the attention weighted feature map can be concatenated with the voxel grid representation. In other examples, the attention weighted feature map can be added element wise to the voxel grid representation to generate an intermediate feature map.

The intermediate feature map can be used as input to a subsequent residual block. If so, it can again be multiplied with the binary attention mask. The cost volume generation system 336 can be designed to repeat any number of times and will include that number of residual blocks. Once the total number of residual block cycles have been completed, the output of the cost map generation system can be a final attention weighted feature map.

The final attention weighted feature map can be used by the cost volume generation system 336 as input to one or more machine learned models. The machine-learned model(s) can use the final attention weighted feature map to generate perception and prediction data. For example, the perception and prediction data can include a listing of detected objects, their location, size, orientation, and velocity. It can also include predicted movement for those objects in the future.

This perception and prediction data can be used to train the other aspects of the system (e.g., models for generating the feature map, models for generating the binary attention mask, and models for generating the planning cost volume). In addition, the perception and prediction data can be used by other components of the vehicle computing system (e.g., fail-safe mechanisms, etc.). In some examples, the planning cost volume can be used to generate trajectories and the perception and prediction data is not used for while performing the motion planning function of the autonomous vehicle (e.g., autonomous vehicle 105 in FIG. 1).

The planning cost volume can be a three-dimensional (H×W×T) grid, where H and W represent spatial dimensions in the bird's eye view representation of the area around the autonomous vehicle and T represents different layers, each layer representing a particular point in time (or time step). The number of time (T) layers can be based on the planning horizon of the autonomous vehicle (e.g., how far into the future the autonomous vehicle (e.g., autonomous vehicle 105 in FIG. 1) plans its trajectories).

In some examples, the cost volume has, for each point in the three-dimensional grid, a cost associated with that H W position at time T. The cost value associated with each point in the three-dimensional map can represent the cost associated with the autonomous vehicle (e.g., autonomous vehicle 105 in FIG. 1) moving into that location at that time (T). A higher cost can indicate that the position is less good. Goodness can be defined as the degree to which it matches the actions of a human driver. Other measurements of goodness can be represented by the cost value such as achieving a reduction in the likelihood of an accident, observing rules of the road, maintaining safe distances from obstacles, etc.

The trajectory selection system 338 can use the planning cost volume to select a trajectory for the autonomous vehicle (e.g., autonomous vehicle 105 in FIG. 1). To do so, the trajectory selection system 338 can generate a plurality of candidate trajectories. Each candidate trajectory includes a series of waypoints, each waypoint describing a position and a time. The trajectory selection system 338 can use the series of waypoints and the planning cost volume to generate a total cost for each candidate trajectory.

For each candidate trajectory, the trajectory selection system 338 can identify a cost for each waypoint in the series of waypoints. To identify a cost for a particular waypoint, the trajectory selection system 338 can determine the location of the waypoint and the time associated with the waypoint. Using this information, the trajectory selection system 338 can look up the associated cost in the planning cost volume. The costs for each waypoint can be aggregated (e.g., summed) to generate the total cost for the candidate trajectory. For example, the aggregation can be represented as follows:

$$c(\tau, X) = \sum_{t=1}^{T} C_{t,x_k,y_t}(X).$$

Once the attention system has selected a trajectory for the autonomous vehicle (e.g., autonomous vehicle 105 in FIG. 1), the vehicle computing system (e.g., vehicle computing system 110 in FIG. 1) can generate signals or commands to send to the control systems of the autonomous vehicle to implement the selected trajectory. The autonomy system (e.g., autonomy computing system 140 in FIG. 1) can output data indicative of the generated trajectories and corresponding control signals can be sent to vehicle control system(s) (e.g., acceleration, steering, braking, etc. systems) to enable the autonomous vehicle (e.g., autonomous vehicle 105 in FIG. 1) to autonomously navigate (e.g., to its target destination).

Figure 4:
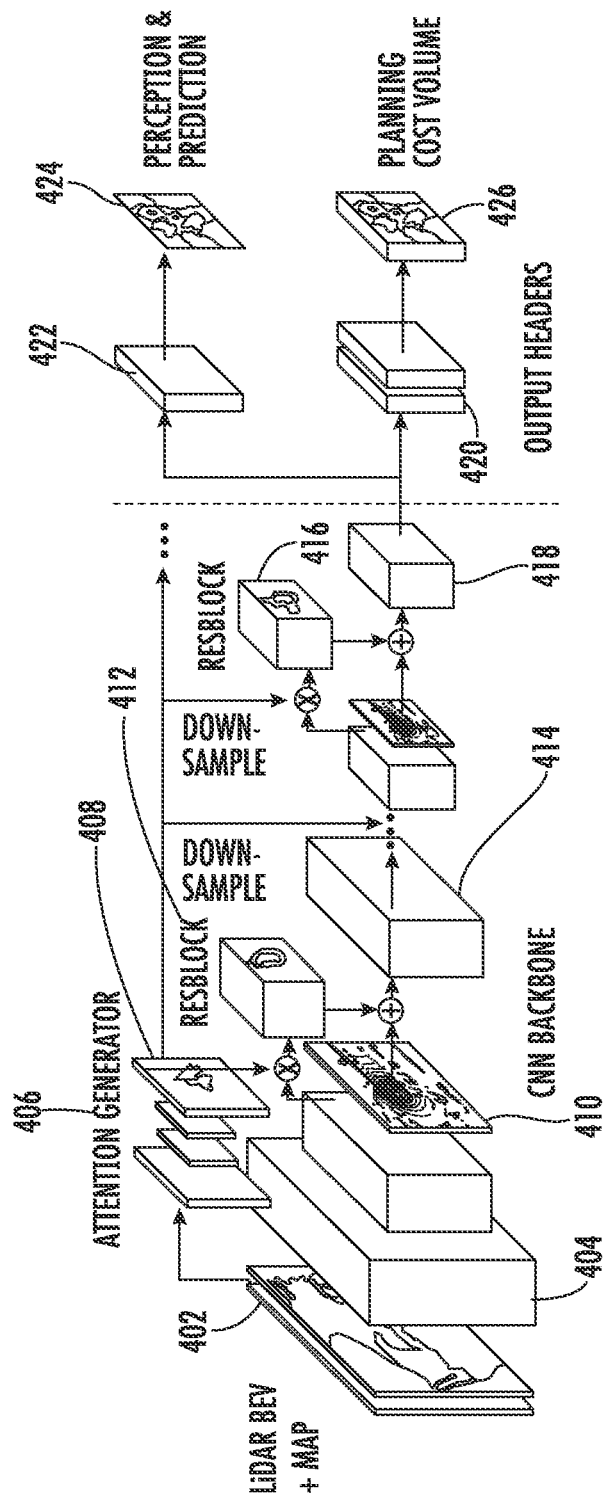
FIG. 4 depicts an example diagram illustrating a process for generating a planning cost volume using a binary attention mask according to example embodiments of the present disclosure.

FIG. 4 depicts an example diagram illustrating a process 400 for generating a planning cost volume according to example embodiments of the present disclosure. To do so, the vehicle computing system (e.g., vehicle computing system 110 in FIG. 1) can access LIDAR data and map data 402 presented in a bird's-eye view representation. The vehicle computing system (e.g., vehicle computing system 110 in FIG. 1) can use the LIDAR data and map data 402 as input to a machine-learned model 404 for generating a feature map. In addition, the LIDAR data and map data 402 can be used as input to an attention generator 406 to generate an attention mask 408. In some examples, the LIDAR data and map data 402 can be downscaled prior to being used as input to the attention generator 406.

The one or more machine-learned models 404 can generate an initial feature map in response to the LIDAR data and map data 402. The attention generator 406 can output an attention mask. The attention mask 408 can be applied to the initial feature map 410 to produce an attention focused initial feature map. For example, each value in the initial feature map 410 can be multiplied by the corresponding value in the feature map, such that feature map data in areas associated with high attention receives additional focus from the machine-learned model.

The attention-focused initial feature map is used as input to a residual block function 412. The residual block 412 outputs an intermediate version of the feature map, denoted herein as an attention weighted feature map. The attention weighted feature map can then be added back with the initial feature map 410. For example, the attention weighted feature map can be concatenated with the initial feature data. In other examples, the attention weighted feature map can be added element wise to the initial feature map to generate an intermediate feature map.

The intermediate feature map can input to subsequent layers of the machine-learned model 414. In addition, the intermediate feature map can be down sampled to produce a smaller representation of the intermediate feature map. The intermediate feature map can be used as input to a subsequent residual block 416. It can again be multiplied with the attention mask 408. This process can be repeated any number of times and the system can be designed to include that number of residual blocks. Once the total number of residual block cycles have been completed, the output of the system can be final attention weighted feature map 418.

The final attention weighted feature map 418 can be used as input to one or more machine learned models 420 and 422. The machine-learned model(s) can use the final attention weighted feature map 418 to generate perception and prediction data 424. For example, the perception and prediction data 424 can include a listing of detected objects, their location, size, orientation, and velocity. It can also include predicted movement for those objects in the future.

The machine-learned models can output a planning cost volume 426. The planning cost volume 426 can be used to generate trajectories for the autonomous vehicle (e.g., autonomous vehicle 105 in FIG. 1).

Figure 5:
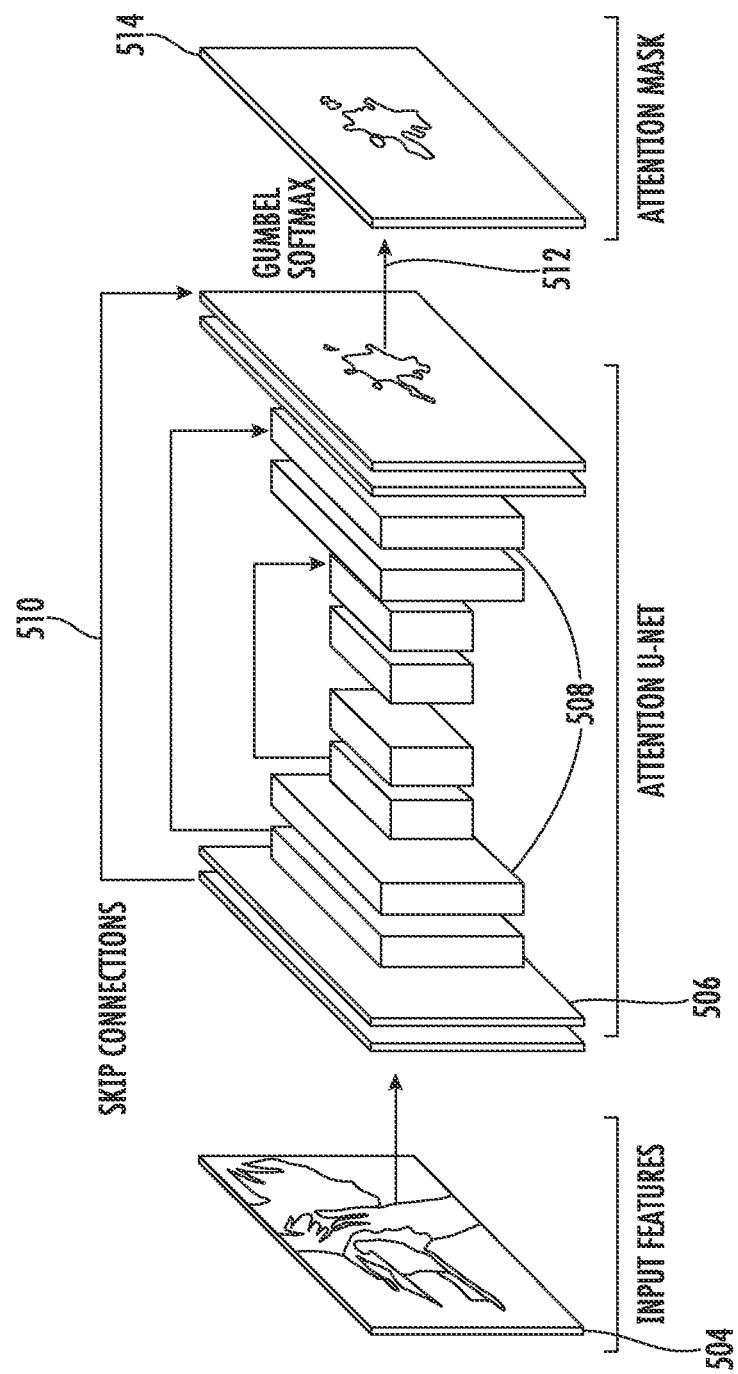
FIG. 5 depicts an example diagram illustrating a process for generating a binary attention mask according to example embodiments of the present disclosure.

FIG. 5 depicts an example diagram illustrating a process for generating a binary attention mask according to example embodiments of the present disclosure. In some examples, the attention generator 406 can use input features 504 as input to a machine-learned model 508 with a plurality of layers. The attention generator 406 can convert the grid of scalar values into a binary attention mask. In some examples, some layers of the machine-learned model 508 can downscale or upscale the dimensions of the input features. In addition, the multi-layer machine-learned model can include one or more skip connections 510 that use the output of one layer as input to a layer that is not immediately subsequent.

The machine-learned model 506 can output an attention mask. The attention generator 406 can convert the attention mask to a binary attention mask 514 in which all the scalar values can be converted into either a one or zero. To do so, the attention generator 406 can employ the Gumbel SoftMax technique 512 to convert each scalar value to either a one or a zero. To do so, the mask generation system can add Gumbel noise to each scalar value. In this example, i and j denote spatial coordinates and $z_{i,j}$ represent the scalar output from the CNN at i, j coordinate. Thus, Gumble noise can be added as follows:

$$\pi_{i,j} = \text{sigmoid}(z_{i,j})$$
$$\alpha_{i,j}^{(0)} = \log \pi_{i,j} + g_{i,j}^{(0)}$$
$$\alpha_{i,j}^{(1)} = \log(1 - \pi_{i,j}) + g_{i,j}^{(1)},$$

where $g_{i,j} = -\log(-\log u)$ and u is sampled from a uniform set from 0 to 1. When the inference is made, the mask generation system can generate the hard attention value (e.g., a binary value) by comparing the values as follows:

$$A_{i,j} = \begin{cases} 1 & \text{if } \alpha_{i,j}^{(0)} \geq \alpha_{i,j}^{(1)} \\ 0 & \text{otherwise.} \end{cases}$$

By using the Gumbel SoftMax technique, the attention generator 406 can enable differentiation to be used on this stage of the process while the CNN is being trained. The binary attention mask can be organized such that it includes binary values arranged in a grid, with each binary value associated with a particular portion of the voxel grid representation.

Figure 6:
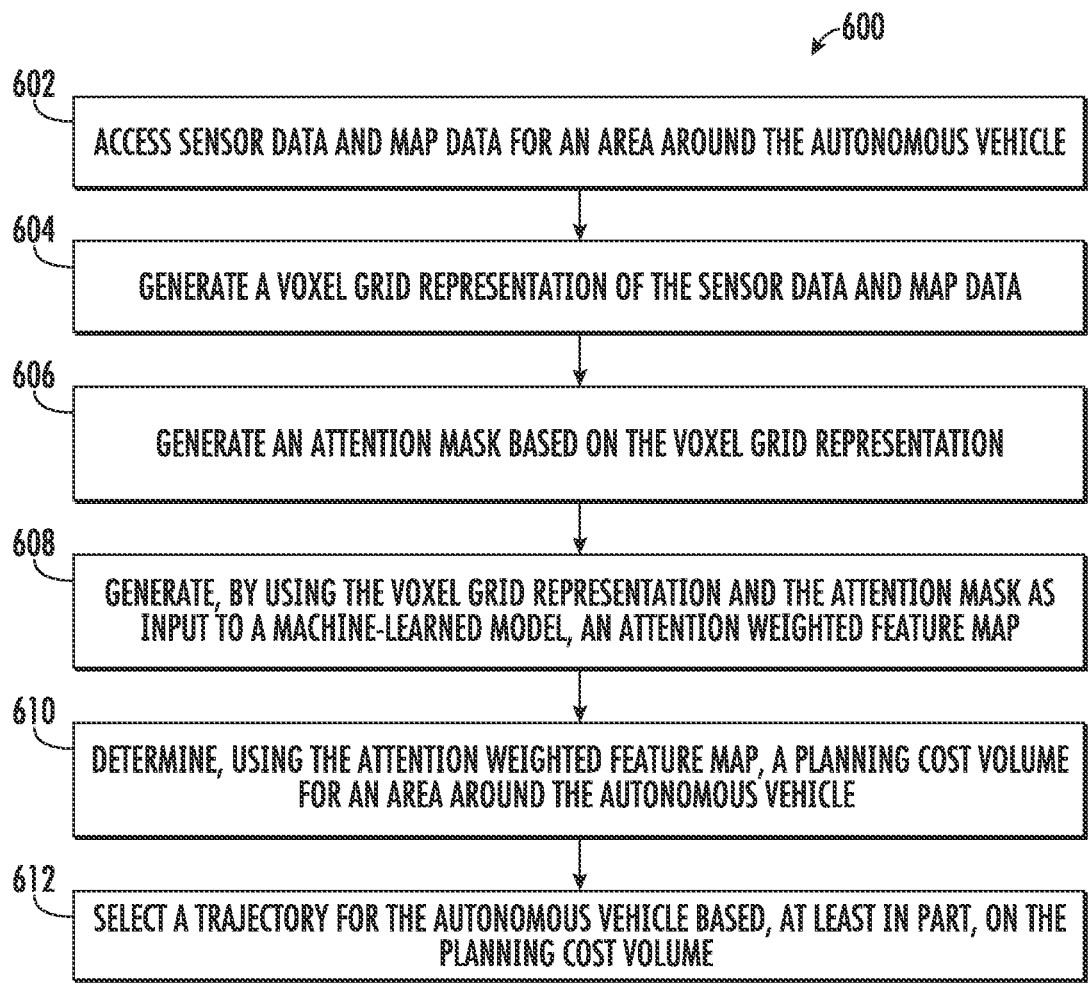
FIG. 6 depicts a flow chart diagram of an example method according to example embodiments of the present disclosure.

FIG. 6 depicts a flow diagram of an example method 600 for using attention masks to improve motion planning according to example embodiments of the present disclosure. One or more portion(s) of the method 600 can be implemented by one or more computing devices such as, for example, the computing devices described in FIGS. 1, 2A, 2B, 7, and 8. Moreover, one or more portion(s) of the method 600 can be implemented as an algorithm on the hardware components of the device(s) described herein (e.g., as in FIGS. 1, 2A, 2B, 7, and 8) to, for example, use attention masks to improve motion planning (e.g., autonomous vehicle 105 in FIG. 1). FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

The following example is described the technology of this disclosure within the context of an autonomous vehicle/ vehicle computing system for example purposes only. As described herein, the technology described is not limited to autonomous vehicles and can be implemented within other robotic and computing systems.

An autonomous vehicle (e.g., autonomous vehicle 105 in FIG. 1) can include a vehicle computing system (e.g., vehicle computing system 110 in FIG. 1). The vehicle computing system (e.g., vehicle computing system 110 in FIG. 1) can access, at 602, sensor data and map data for an area around the autonomous vehicle (e.g., autonomous vehicle 105 in FIG. 1). In some examples, the LIDAR sensor data includes a plurality of LIDAR points, each LIDAR point having an associated location. In some examples, sensor data includes data from a plurality of sweeps of the LIDAR sensor.

In some examples, the map data can include data describing, among other things, lanes, boundaries, crossing areas, and traffic control mechanisms (e.g., stop signs, traffic lights, etc.). The map data can be rasterized such that important aspects of the map data can be made more distinct. In some examples, the map data can be presented from a bird's eye view perspective.

In some examples, the vehicle computing system (e.g., vehicle computing system 110 in FIG. 1) can generate, at 604, a voxel grid representation of the sensor data and map data. Thus, for the point cloud data produced by the LIDAR, the three-dimensional space in which the point cloud data exists can be divided into a plurality of subsections. In general, each subsection can be of the same size. In addition, the point cloud data can include data produced by a plurality of sweeps of the LIDAR sensor (each sweep representing a complete rotation of the sensor) representing a period of time (e.g., all the sweeps that occur in a 0.5 second time period).

In some examples, the vehicle computing system (e.g., vehicle computing system 110 in FIG. 1) can generate, at 606, an attention mask based on the voxel grid representation. The attention mask can represent which areas of the voxel grid representation should receive most of the attention of the vehicle computing system (e.g., vehicle computing system 110 in FIG. 1).

In some examples, the attention mask includes a grid of attention values, each respective attention value associated with a particular location in the voxel grid representation. In some examples, the attention value is a scalar value. In some examples, the scalar values are associated with the importance associated with the associated location of the voxel grid representation. In some examples, importance can also be referred to as usefulness. Thus, a model can be trained to generate scalar values based on whether the resulting motion plans are accurate to ground truth data. Thus, scalar values can represent the degree to which prioritizing the associated areas of the voxel grid representation results in accurate and useful motion plans based on predetermined training data.

In some examples, the scalar values can be between 0 and 1 (or can be normalized to a value between 0 and 1). In some examples, for each respective scalar value, the vehicle computing system (e.g., vehicle computing system 110 in FIG. 1) can determine whether the respective scalar value exceeds a predetermined threshold value. The predetermined threshold value can be, for example, 0.5.

In some examples, in accordance with a determination that the respective scalar value exceeds the predetermined threshold value, the vehicle computing system (e.g., vehicle computing system 110 in FIG. 1) can set the respective scalar value to one. In accordance with a determination that the respective scalar value does not exceed the predetermined threshold value, the vehicle computing system (e.g., vehicle computing system 110 in FIG. 1) can set the respective scalar value to zero.

In some examples, the vehicle computing system (e.g., vehicle computing system 110 in FIG. 1) can, at 608, generate, by using the voxel grid representation and the attention mask as input to a machine-learned model, an attention weighted feature map. To do so, the vehicle computing system (e.g., vehicle computing system 110 in FIG. 1) can generate a sparse feature map by multiplying the voxel grid representation and the attention mask. The vehicle computing system (e.g., vehicle computing system 110 in FIG. 1) can receive the attention weighted feature map as output from one or more machine-learned models using the sparse feature map and the attention mask as input.

In some examples, the vehicle computing system (e.g., vehicle computing system 110 in FIG. 1) can generate an attention weighted feature map by concatenating the attention weighted feature map with the voxel grid representation. In some examples, the vehicle computing system (e.g., vehicle computing system 110 in FIG. 1) can generate a list of detected objects based, at least in part, on the attention weighted feature map. For examples, the list of detected objects can include all the objects that are within the range of the LIDAR sensor and information associated with those objects, such as location, orientation, velocity, heading, and so on.

In some examples, the vehicle computing system (e.g., vehicle computing system 110 in FIG. 1) can, at 610, determine, using the attention weighted feature map, a planning cost volume for an area around the autonomous vehicle (e.g., autonomous vehicle 105 in FIG. 1). In some examples, the planning cost volume can include a cost associated with each position in the planning cost volume. In some examples, the planning cost volume includes costs associated with each position and time step described by the planning cost volume.

In some examples, the vehicle computing system (e.g., vehicle computing system 110 in FIG. 1) can select, at 612, a trajectory for the autonomous vehicle (e.g., autonomous vehicle 105 in FIG. 1) based, at least in part, on the planning cost volume. To do so, the vehicle computing system (e.g., vehicle computing system 110 in FIG. 1) can generate a plurality of candidate trajectories for the autonomous vehicle (e.g., autonomous vehicle 105 in FIG. 1), each candidate trajectory including a series of points that represent the route of the autonomous vehicle (e.g., autonomous vehicle 105 in FIG. 1) through the area around the autonomous vehicle (e.g., autonomous vehicle 105 in FIG. 1) and each point is associated with a particular point in time.

For a respective candidate trajectory in the plurality of candidate trajectories, the vehicle computing system (e.g., vehicle computing system 110 in FIG. 1) can determine a cost for each respective point in the series of points associated with the respective trajectory by using the location of the respective point and the time associated with the point to identify the predicted cost of the point in the cost volume map. The vehicle computing system (e.g., vehicle computing system 110 in FIG. 1) can aggregate the costs for each position in the series of positions into a total cost associated with the respective candidate trajectory. The vehicle computing system (e.g., vehicle computing system 110 in FIG. 1) can select the candidate trajectory with the lowest total cost.

Figure 7:
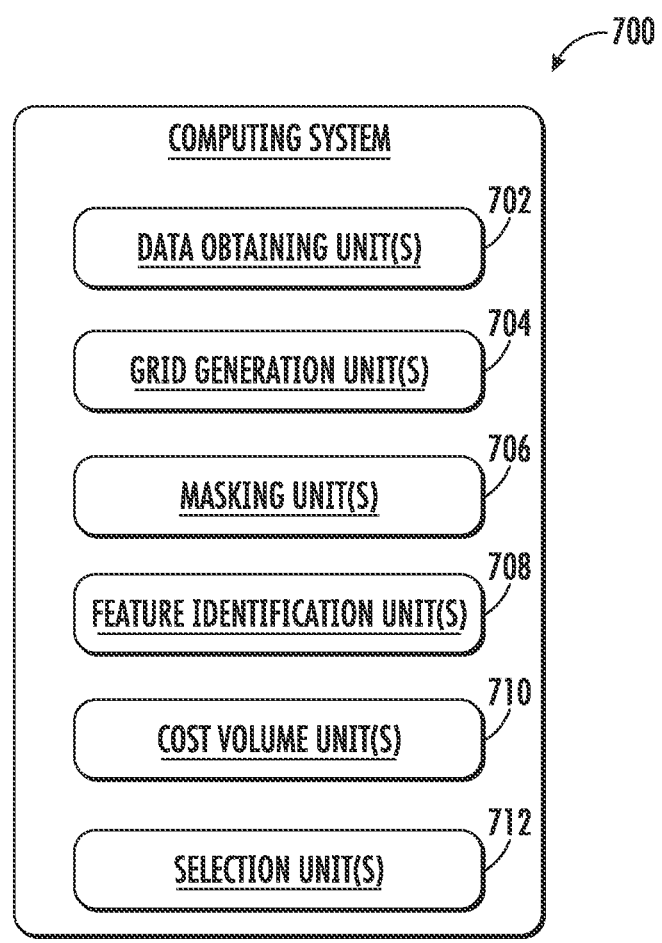
FIG. 7 depicts an example system with units for performing operations and functions according to example aspects of the present disclosure.

FIG. 7 depicts an example system 700 with units for performing operations and functions according to example aspects of the present disclosure. Various means can be configured to perform the methods and processes described herein. For example, a computing system can include data obtaining units(s) 702, grid generation units(s) 704, masking units(s) 706, feature identification unit(s) 708, cost volume unit(s) 710, selection unit(s) 712, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to access sensor data and map data for an area around the autonomous vehicle (e.g., autonomous vehicle 105 in FIG. 1). For example, a vehicle computing system (e.g., vehicle computing system 110 in FIG. 1) can receive sensor data from a LIDAR sensor and map data that describes geographic features of the area around the autonomous vehicle (e.g., autonomous vehicle 105 in FIG. 1). A data obtaining unit 702 is one example of a means for accessing sensor data and map data for an area around the autonomous vehicle (e.g., autonomous vehicle 105 in FIG. 1).

The means can be configured to generate a voxel grid representation of the sensor data and map data. For example, the vehicle computing system (e.g., vehicle computing system 110 in FIG. 1) can generate a voxel representation of the LIDAR data and rasterized map. A grid generation unit 704 is one example of a means for generating a voxel grid representation of the sensor data and map data.

The means can be configured to generate an attention mask based on the voxel grid representation. For example, the vehicle computing system (e.g., vehicle computing system 110 in FIG. 1) can, using a machine-learned model, generate attention values for each location in the voxel grid representation. Each location that has an attention value above a predetermined threshold value will be assigned a value of one and locations with an attention value below the predetermined threshold will be assigned a value of zero. A masking unit 706 is one example of a means for generating an attention mask based on the voxel grid representation.

The means can be configured to generate, using the voxel grid representation and the attention mask as input to a machine-learned model, an attention weighted feature map. For example, the vehicle computing system (e.g., vehicle computing system 110 in FIG. 1) can elementwise multiply the voxel grid representation and the attention mask and use the result as input to a machine-learned model. A feature identification unit 708 is one example of a means for generating, using the voxel grid representation and the attention mask as input to a machine-learned model, an attention weighted feature map.

The means can be configured to determine, using the attention weighted feature map, a planning cost volume for an area around the autonomous vehicle (e.g., autonomous vehicle 105 in FIG. 1). For example, the vehicle computing system (e.g., vehicle computing system 110 in FIG. 1) can generate a cost volume, the cost volume includes a grid of costs, each grid point associated with a particular location and a particular time. A cost volume unit 710 is one example of a means for determining using the attention weighted feature map, a planning cost volume for an area around the autonomous vehicle (e.g., autonomous vehicle 105 in FIG. 1).

The means can be configured to select a trajectory for the autonomous vehicle (e.g., autonomous vehicle 105 in FIG. 1) based, at least in part, on the planning cost volume. For example, the vehicle computing system (e.g., vehicle computing system 110 in FIG. 1) can select the candidate trajectory with the lowest total cost. A selection unit 712 is one example of a means for selecting a trajectory for the autonomous vehicle (e.g., autonomous vehicle 105 in FIG. 1) based, at least in part, on the planning cost volume.

Figure 8:
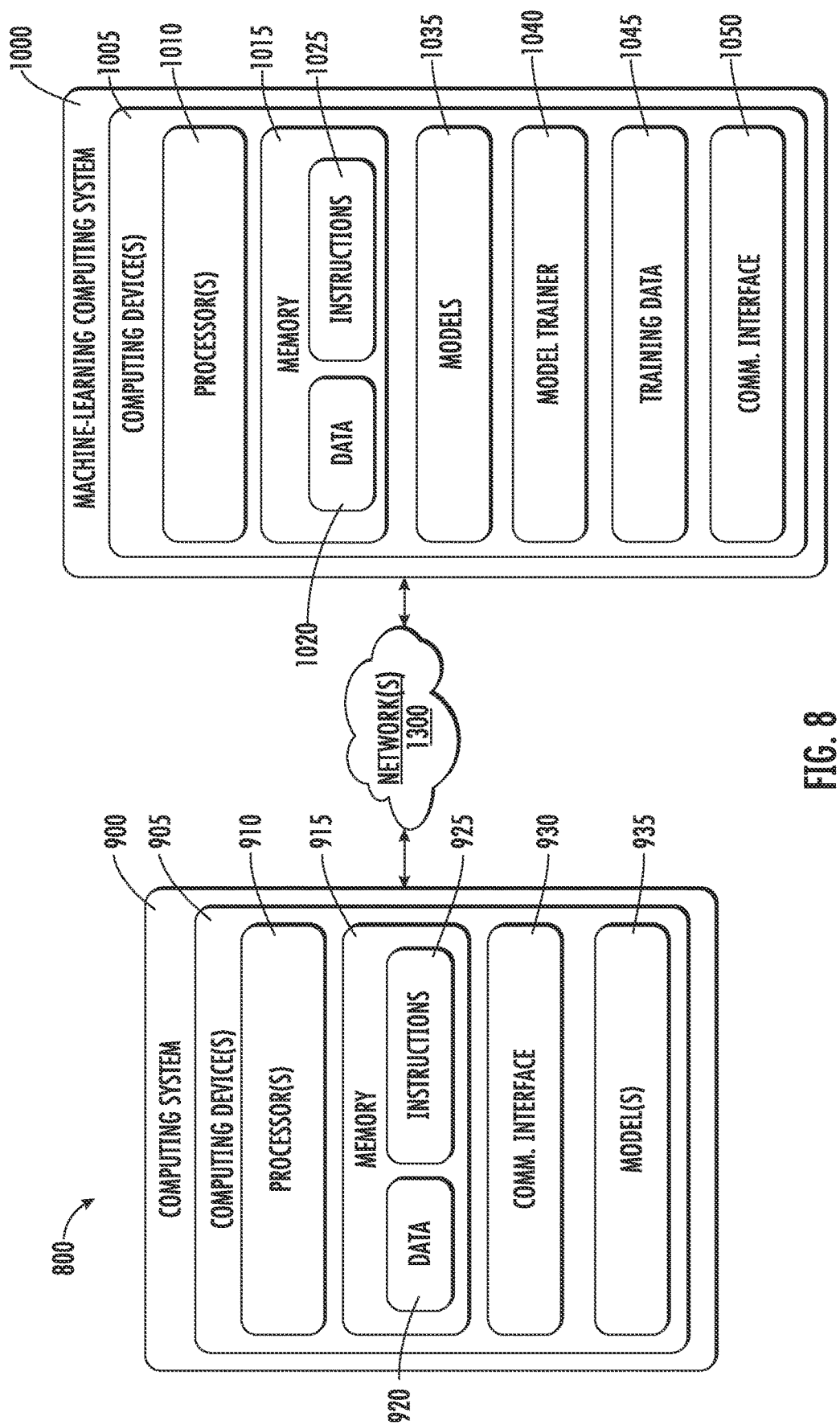
FIG. 8 depicts example system components according to example aspects of the present disclosure.

FIG. 8 depicts a block diagram of an example computing system 800 according to example embodiments of the present disclosure. The example system 800 includes a computing system 900 and a machine learning computing system 1000 that are communicatively coupled over one or more networks 1300.

In some implementations, the computing system 900 can perform a process for using attention masks to improve object detection and path planning in autonomous vehicles (e.g., autonomous vehicle 105 in FIG. 1). In some implementations, the computing system 900 can be included in an autonomous vehicle (e.g., autonomous vehicle 105 in FIG. 1). For example, the computing system 900 can be on-board the autonomous vehicle (e.g., autonomous vehicle 105 in FIG. 1). In other implementations, the computing system 900 is not located on-board the autonomous vehicle (e.g., autonomous vehicle 105 in FIG. 1). The computing system 900 can include one or more distinct physical computing devices.

The computing system 900 can include a computing device 905. The computing device 905 can include one or more processors 910 and a memory 915. The one or more processors 910 can be any suitable processing device (e.g., a processor core, a microprocessor, an ASIC, a FPGA, a controller, a microcontroller, etc.) and can be one processor or a plurality of processors that are operatively connected. The memory 915 can include one or more non-transitory computer-readable storage media, such as RAM, ROM, EEPROM, EPROM, one or more memory devices, flash memory devices, etc., and combinations thereof.

The memory 915 can store information that can be accessed by the one or more processors 910. For instance, the memory 915 (e.g., one or more non-transitory computer-readable storage mediums, memory devices) can store data that can be obtained, received, accessed, written, manipulated, created, and/or stored. The data 920 can include, for instance, include any of the data/information described herein and/or other data. In some implementations, the computing system 900 can obtain data from one or more memory device(s) that are remote from the computing system 900.

The memory 915 can also store computer-readable instructions 925 that can be executed by the one or more processors 910. The instructions 925 can be software written in any suitable programming language or can be implemented in hardware. Additionally, or alternatively, the instructions 925 can be executed in logically and/or virtually separate threads on processor(s) 910.

For example, the memory 915 can store instructions 925 that when executed by the one or more processors 910 cause the one or more processors 910 (the computing system) to perform any of the operations and/or functions described herein, including, for example, insert functions.

According to an aspect of the present disclosure, the computing device 905 can store or include one or more machine-learned models 935. As examples, the machine-learned models 935 can be or can otherwise include various machine-learned models such as, for example, neural networks (e.g., deep neural networks), support vector machines, decision trees, ensemble models, k-nearest neighbors models, Bayesian networks, multi-layer perceptron networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 900 can receive the one or more machine-learned models 935 from the machine learning computing system 1000 over network(s) 1300 and can store the one or more machine-learned models 935 in the memory 915. The computing system 900 can then use or otherwise implement the one or more machine-learned models 935 (e.g., by processor(s) 910). In particular, the computing system 900 can implement the machine learned model(s) 935 to generate an attention mask for use in trajectory planning for use in autonomous vehicles (e.g., autonomous vehicle 105 in FIG. 1).

The machine learning computing system 1000 can include one or more computing devices 1005. The machine learning computing system 1000 can include one or more processors 1010 and a memory 1015. The one or more processors 1010 can be any suitable processing device (e.g., a processor core, a microprocessor, an ASIC, a FPGA, a controller, a microcontroller, etc.) and can be one processor or a plurality of processors that are operatively connected. The memory 1015 can include one or more non-transitory computer-readable storage media, such as RAM, ROM, EEPROM, EPROM, one or more memory devices, flash memory devices, etc., and combinations thereof.

The memory 1015 can store information that can be accessed by the one or more processors 1010. For instance, the memory 1015 (e.g., one or more non-transitory computer-readable storage mediums, memory devices) can store data 1020 that can be obtained, received, accessed, written, manipulated, created, and/or stored. The data 1020 can include, for instance, include any of the data/information described herein and/or other data. In some implementations, the machine learning computing system 1000 can obtain data from one or more memory device(s) that are remote from the machine learning computing system 1000.

The memory 1015 can also store computer-readable instructions 1025 that can be executed by the one or more processors 1010. The instructions 1025 can be software written in any suitable programming language or can be implemented in hardware. Additionally, or alternatively, the instructions 1025 can be executed in logically and/or virtually separate threads on processor(s) 1010.

For example, the memory 1015 can store instructions 1025 that when executed by the one or more processors 1010 cause the one or more processors 1010 (the computing system) to perform any of the operations and/or functions described herein, including, for example, insert functions.

In some implementations, the machine learning computing system 1000 includes one or more server computing devices. If the machine learning computing system 1000 includes multiple server computing devices, such server computing devices can operate according to various computing architectures, including, for example, sequential computing architectures, parallel computing architectures, or some combination thereof.

In addition or alternatively to the model(s) 1035 at the computing system 900, the machine learning computing system 1000 can include one or more machine-learned models 1035. As examples, the machine-learned models 1035 can be or can otherwise include various machine-learned models such as, for example, neural networks (e.g., deep neural networks), support vector machines, decision trees, ensemble models, k-nearest neighbors models, Bayesian networks, multi-layer perceptrons, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1000 can communicate with the computing system 900 according to a client-server relationship. For example, the machine learning computing system 1000 can implement the machine-learned models 1035 to provide a web service to the computing system 900. For example, the web service can provide a process to generate an attention mask for use in generating a planning cost volume for use in autonomous vehicles (e.g., autonomous vehicle 105 in FIG. 1).

Thus, machine-learned models 935 can be located and used at the computing system 900 and/or machine-learned models 1035 can be located and used at the machine learning computing system 1000.

In some implementations, the machine learning computing system 1000 and/or the computing system 900 can train the machine-learned models 935 through use of a model trainer 1040. The model trainer 1040 can train the machine-learned models 935 and/or 1040 using one or more training or learning algorithms. One example training technique is backwards propagation of errors. In some implementations, the model trainer 1040 can perform supervised training techniques using a set of labeled training data. In other implementations, the model trainer 1040 can perform unsupervised training techniques using a set of unlabeled training data. The model trainer 1040 can perform a number of generalization techniques to improve the generalization capability of the models being trained. Generalization techniques include weight decays, dropouts, or other techniques.

In particular, the model trainer 1040 can train a machine-learned model 935 and/or 1140 based on a set of training data 1045. The training data 1045 can include, for example, manually labelled data which represents the trajectories driven by human drivers in a given situation, in which the LIDAR data has an associated list of objects, each object including a determined size, location, orientation, and velocity. The model trainer 1040 can be implemented in hardware, firmware, and/or software controlling one or more processors.

The model trainer 1040 can be configured to improve the performance of the models by, during the training phase, calculating the multiple different loss values. For example, the loss associated with a particular iteration of training the machine-learned model can be calculated as follows:

$$\mathcal{L} = \lambda_{class}\mathcal{L}_{class} + \lambda_{reg}\mathcal{L}_{reg} + \lambda_{plan}\mathcal{L}_{plan} + \lambda_A\mathcal{L}_A + \lambda\|\omega\|_2^2,$$

where $\mathcal{L}_\lambda$ is a L1 loss that controls the sparsity of the attention mask, and $\|\omega\|_2^2$ is the standard weight decay term.

Each component of the loss data can represent a particular task in the multi-task learning process. One component of the loss data can reduce the effect of error for areas of the feature map/voxel grid representation that are not included in the attention area of the binary attention mask. The losses associated with the perception and prediction functions can be re-weighted as follows:

$$\mathcal{L}_{class} = \gamma_1 \sum_{i,j} A_{i,j}\mathcal{L}_{class,i,j} + \gamma_0 \sum_{i,j}(1 - A_{i,j})\mathcal{L}_{class,i,j},$$

$$\mathcal{L}_{reg} = \gamma_1 \sum_{i,j} A_{i,j}\mathcal{L}_{reg,i,j} + \gamma_0 \sum_{i,j}(1 - A_{i,j})\mathcal{L}_{reg,i,j},$$

where $\gamma_1$ is the weighting for attended instances, $\gamma_0$ and for unattended ones, and the experiment fixes $\gamma_0=0.1$ and $\gamma_1=0.9$.

Similarly, the prediction and perception loss score can be calculated as follows:

$$\mathcal{L}_{class,i,j} = \sum_k -\hat{y}_{i,j,k}\log(y_{i,j,k}) - (1 - \hat{y}_{i,j,k})\log y_{i,j,k},$$

where y is a predicted classification score between 0 and 1, and y is the binary ground truth. For each detected instance of an object, the model outputs a bounding box (x, y, w, h), and a pair of coordinates and angles for each future step. The distance between a predicted object's bounding box and the ground truth bounding box can be 6-dimensional vector as follows:

$$\delta_t = \left(\frac{x_a - x}{w}, \frac{y_a - y}{h}, \log \frac{w_a}{w}, \log \frac{h_a}{h}, \sin(\theta_a - \theta), \cos(\theta_a - \theta)\right).$$

The loss can then be applied for a trajectory of the object up to a time T. For each spatial coordinate (i,j), the system can aggregate the losses for all objects that below to a particular location as follows:

$$\mathcal{L}_{reg,i,j} = \sum_{b \in (i,j)} \sum_{t=0}^{T} SmoothL1(\hat{\delta}_{b,t}, \delta_{b,t}),$$

wherein $\hat{\delta}$ is the model predicted shifts and $\delta$ is the ground truth shifts The loss data can also include a motion planning loss, which represents the difference in cost of the ground truth trajectory as evaluated by the planning cost volume and one or more lowest cost trajectories selected by the multi-stage network. For example, that difference can be calculated as follows:

$$\mathcal{L}_{plan} = \max_{i=1\ldots N} \sum_{t=0}^{T} \max\{0, c_t - c_t^{(i)} + \Delta_t^{(i)}\},$$

where $\Delta_t^{(i)}$ is the task loss that captures spatial position differences and traffic rule violations encoded in binary values as follows:

$$\Delta_t^{(i)} = \|(x_t, y_t) - (x_t^{(i)}, y_t^{(i)})\|_2 + v_t^{(i)}.$$

In addition, the loss data can include a factor that encourages the multi-stage machine-learned model to have a more tightly focused (smaller) attention area. For example, an attention sparsity loss factor can be calculated as:

$$\mathcal{L}_{\tilde{A}} = \sum_{i,j} \tilde{A}_{i,j}.$$

which introduces a loss proportionate to the number of points outside the attention area of the binary attention mask. The above factors can be included in the loss calculation and applied to alter the weights and biases of the multi-stage machine-learned model at each stage.

The computing system 900 and the machine learning computing system 1000 can each include a communication interface 930 and 1050, respectively. The communication interfaces 930/1050 can used to communicate with one or more systems or devices, including systems or devices that are remotely located from the computing system 900 and the machine learning computing system 1000 A communication interface 930/1050 can include any circuits, components, software, etc. for communicating with one or more networks (e.g., 1300). In some implementations, a communication interface 930/1050 can include, for example, one or more of a communications controller, receiver, transceiver, transmitter, port, conductors, software and/or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1300 can be accomplished, for instance, via a network interface using any type of protocol, protection scheme, encoding, format, packaging, etc.

FIG. 800 illustrates one example computing system 800 that can be used to implement the present disclosure. Other computing systems can be used as well. For example, in some implementations, the computing system 900 can include the model trainer 1040 and the training dataset 1045. In such implementations, the machine-learned models 1040 can be both trained and used locally at the computing system 900. As another example, in some implementations, the computing system 900 is not connected to other computing systems.

In addition, components illustrated and/or discussed as being included in one of the computing systems 900 or 1000 can instead be included in another of the computing systems 900 or 1000. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for improving autonomous vehicle motion planning, the method comprising:

accessing, by a computing system including one or more processors, sensor data and map data for an area around an autonomous vehicle;

generating, by the computing system, a voxel grid representation of the sensor data and the map data;

generating, by the computing system, an attention mask based on the voxel grid representation, wherein the attention mask is generated using a first machine-learned model trained to generate a grid of attention values, each of the attention values representing an importance of the map data to navigating the autonomous vehicle and wherein the importance of an attention value of the attention values is determined, at least in part, on a position of the respective attention value relative to the autonomous vehicle;

generating, by the computing system by using the voxel grid representation and the attention mask as input to a second machine-learned model, an attention weighted feature map;
determining, by the computing system, using the attention weighted feature map, a planning cost volume for the area around the autonomous vehicle;
selecting, by the computing system, a trajectory for the autonomous vehicle based, at least in part, on the planning cost volume; and
controlling, by the computing system, the autonomous vehicle based on the trajectory.

2. The computer-implemented method of claim 1, wherein each respective attention value is associated with a particular location in the voxel grid representation.

3. The computer-implemented method of claim 2, wherein the attention value is a scalar value.

4. The computer-implemented method of claim 3, wherein the scalar value is associated with an importance associated with the particular location of the voxel grid representation.

5. The computer-implemented method of claim 4, wherein the scalar value is between zero and one and wherein generating, by the computing system by using the voxel grid representation and the attention mask as input to the second machine-learned model, the attention weighted feature map further comprises:
for each respective scalar value:
determining whether the respective scalar value exceeds a predetermined threshold value;
in accordance with a determination that the respective scalar value exceeds the predetermined threshold value, setting the respective scalar value to one; and
in accordance with a determination that the respective scalar value does not exceed the predetermined threshold value, setting the respective scalar value to zero.

6. The computer-implemented method of claim 1, wherein generating, by the computing system by using the voxel grid representation and the attention mask as input to the second machine-learned model, the attention weighted feature map further comprises:
generating, by the computing system, a sparse feature map by multiplying the voxel grid representation and the attention mask; and
receiving, by the computing system, the attention weighted feature map as output from one or more machine-learned models using the sparse feature map and the attention mask as input.

7. The computer-implemented method of claim 6, wherein generating, by the computing system by using the voxel grid representation and the attention mask as input to the second machine-learned model, the attention weighted feature map further comprises:
concatenating, by the computing system, the attention weighted feature map with the voxel grid representation.

8. The computer-implemented method of claim 1, wherein the planning cost volume comprises a cost associated with each position in the planning cost volume.

9. The computer-implemented method of claim 8, wherein the planning cost volume comprises costs associated with each said position and time step described by the planning cost volume.

10. The computer-implemented method of claim 9, wherein selecting, by the computing system, the trajectory for the autonomous vehicle based, at least in part, on the planning cost volume further comprises:
generating, by the computing system, a plurality of candidate trajectories for the autonomous vehicle, each candidate trajectory comprising a series of points that represent a route of the autonomous vehicle through the area around the autonomous vehicle, each point being associated with a particular point in time.

11. The computer-implemented method of claim 10, wherein selecting, by the computing system, the trajectory for the autonomous vehicle based, at least in part, on the planning cost volume further comprises:
for a respective candidate trajectory in the plurality of candidate trajectories:
determining, by the computing system, a cost for each respective point in the series of points associated with the respective candidate trajectory by using a location of the respective point and the associated point in time to identify a predicted cost of the point in the planning cost volume; and
aggregating, by the computing system, the costs for each position in the series of points into a total cost associated for the respective candidate trajectory.

12. The computer-implemented method of claim 10, wherein selecting, by the computing system, the trajectory for the autonomous vehicle based, at least in part, on the planning cost volume further comprises:
selecting, by the computing system, the candidate trajectory with a lowest total cost.

13. The computer-implemented method of claim 1, further comprises:
generating, by the computing system, a list of detected objects based, at least in part, on the attention weighted feature map.

14. A computing system for improving autonomous vehicle motion planning for an autonomous vehicle, the system comprising:
one or more processors and one or more non-transitory computer-readable memories;
wherein the one or more non-transitory computer-readable memories store instructions that, when executed by the processors, cause the computing system to perform operations, the operations comprising:
accessing sensor data and map data for an area around the autonomous vehicle;
generating a voxel grid representation of the sensor data and the map data;
generating an attention mask based on the voxel grid representation, wherein the attention mask is generated using a first machine-learned model trained to generate a grid of attention values, each of the attention values representing an importance of the map data to navigating the autonomous vehicle and wherein the importance of an attention value in the attention values is determined, at least in part, on a position of the respective attention value relative to the autonomous vehicle;
generating, by using the voxel grid representation and the attention mask as input to a second machine-learned model, an attention weighted feature map;
determining, by using the attention weighted feature map, a planning cost volume for the area around the autonomous vehicle;
selecting a trajectory for the autonomous vehicle based on the planning cost volume; and
controlling, by the computing system, the autonomous vehicle based on the trajectory.

* * * * *